US007170474B2

(12) United States Patent
Lee et al.

(10) Patent No.: US 7,170,474 B2
(45) Date of Patent: Jan. 30, 2007

(54) PLASMA DISPLAY PANEL DRIVER, DRIVING METHOD THEREOF, AND PLASMA DISPLAY DEVICE

(75) Inventors: Jun-Young Lee, Cheonan-si (KR); Byung-Nam An, Cheonan-si (KR); Nam-Sung Jung, Yongin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 292 days.

(21) Appl. No.: 10/948,454

(22) Filed: Sep. 24, 2004

(65) Prior Publication Data

US 2005/0073483 A1 Apr. 7, 2005

(30) Foreign Application Priority Data

Oct. 6, 2003 (KR) ..................... 10-2003-0069126

(51) Int. Cl.
*G06T 15/00* (2006.01)

(52) U.S. Cl. ........................ 345/69; 315/169.3; 345/68

(58) Field of Classification Search ................ 345/589, 345/60, 65, 68, 69; 315/169.1, 169.2, 169.3, 315/169.4
See application file for complete search history.

(56) References Cited

U.S. PATENT DOCUMENTS 4,866,349 A 9/1989 Weber et al. ............ 315/169.4
5,081,400 A 1/1992 Weber et al. ............ 315/169.4
5,786,794 A * 7/1998 Kishi et al. .................... 345/60
6,011,355 A * 1/2000 Nagai ...................... 315/169.3
6,373,451 B1 * 4/2002 Kang et al. .................... 345/60
6,559,603 B2 5/2003 Iwami ..................... 315/169.1
6,781,322 B2 * 8/2004 Onozawa et al. ......... 315/169.3
6,806,655 B2 * 10/2004 Choi ....................... 315/169.3
6,963,174 B2 * 11/2005 Lee et al. ................ 315/169.3
7,027,010 B2 * 4/2006 Lee ............................. 345/60
2003/0173905 A1 9/2003 Lee et al. ...................... 345/60

FOREIGN PATENT DOCUMENTS

KR 2002-0020656 3/2002
KR 2003-0076143 9/2003

* cited by examiner

*Primary Examiner*—Phu K. Nguyen
(74) *Attorney, Agent, or Firm*—H.C. Park & Associates, PLC

(57) ABSTRACT

In an address driving circuit including a power recovery circuit, an energy charged in an external capacitor is established to be greater than an energy discharged from the external capacitor. As a result, a voltage of the external capacitor is increased to an address voltage to automatically stop a power recovery operation in the case of displaying a full white pattern. Further, to perform the power recovery operation in the cases of the dot on/off pattern and the line on/off pattern, the voltage of the external capacitor reaches an equilibrium state between the half the address voltage and the address voltage.

40 Claims, 19 Drawing Sheets

PLASMA DISPLAY PANEL DRIVER, DRIVING METHOD THEREOF, AND PLASMA DISPLAY DEVICE

CROSS REFERENCE TO RELATED APPLICATION

This application claims priority to and the benefit of Korea Patent Application No. 2003-69126, filed on Oct. 6, 2003, in the Korean Intellectual Property Office, the content of which is incorporated herein by reference.

BACKGROUND OF THE INVENTION (a) Field of the Invention

The present invention relates to a plasma display panel (PDP) driving circuit. More specifically, the present invention relates to an address driving circuit for applying address voltages.

(b) Description of the Related Art

The PDP is a flat display that uses plasma generated via a gas discharge process to display characters or images, and, depending on its size, tens to millions of pixels are provided thereon in a matrix format PDPs are categorized as direct current (DC) PDPs or alternating current (AC) PDPs according to the supplied driving voltage waveforms and discharge cell structures.

DC PDPs have electrodes exposed in the discharge space. As a result, they allow current to flow in the discharge space while voltage is supplied and therefore require resistors for current restriction. AC PDPs, on the other hand, have electrodes covered by a dielectric layer, due to which capacitances are naturally formed to restrict the current, and the electrodes are protected from ion shocks during discharge. As a result, AC PDPs have a longer lifespan than DC PDPs.

FIG. 1 shows a perspective view of an AC PDP;

As shown, a scan electrode 4 and a sustain electrode 5, disposed over a dielectric layer 2 and a protection film 3, are provided in parallel and form a pair with each other under a first glass substrate 1. A plurality of address electrodes 8 covered with an insulation layer 7 are installed on a second glass substrate 6. Barrier ribs 9 are formed in parallel with the address electrodes 8, on the insulation layer 7 between the address electrodes 8, and phosphor 10 is formed on the surface of the insulation layer 7 between the barrier ribs 9. The first and second glass substrates 1 and 6 having a discharge space 11 between them are provided facing each other so that the scan electrode 4 and the sustain electrode 5 may respectively cross an address electrode 8. An address electrode 8 and a discharge space 11 formed at a crossing part of the scan electrode 4 and the sustain electrode 5 form a discharge cell 12.

FIG. 2 shows a PDP electrode arrangement diagram.

As shown, the PDP electrode has an m×n matrix configuration, and in detail, it has address electrodes $A_1$ to $A_m$ in the column direction, and scan electrodes $Y_1$ to $Y_n$ and sustain electrodes $X_1$ to $X_n$ in the row direction, alternately. The discharge cell 12 shown in FIG. 2 corresponds to the discharge cell 12 shown in FIG. 1.

In general, a method for driving the AC PDP includes a reset period, an address period, a sustain period, and an erase period.

In the reset period, the states of the respective cells are reset to address the cells smoothly. In the addressing period, the cells in a panel to be turned on and the cells not to be turned on are selected, and wall charges are accumulated in the cells to be turned on (i.e., the addressed cells). In the sustain period, discharge is performed to actually display pictures on the addressed cells. In the erase period, the wall charges of the cells are reduced to terminate the sustain.

Because a discharge space between a scan electrode and a sustain electrode and a discharge space between a surface on which an address electrode is formed and a surface on which scan and sustain electrodes are formed operate as capacitive loads (referred to as panel capacitors hereinafter), capacitance exists on the panel. Hence, in addition to power for addressing, reactive power is also needed to apply waveforms for addressing. Therefore, a PDP address driving circuit includes a power recovery circuit for recovering the reactive power and re-using the same, as disclosed by the power recovery circuit of L. F. Weber in U.S. Pat. Nos. 4,866,349 and 5,081,400.

Conventional power recovery circuits fail to recover 100% of the reactive power during the power recovery process due to switching losses in the transistors or parasitic components of the circuit. As a result, the power recovery operation cannot set the voltage at the panel capacitor to a desired voltage, and the switch must perform hard switching.

When all the discharge cells are turned on in a specific subfield, it is necessary for addressing to apply a voltage to the address electrode. The conventional power recovery circuit continues to perform power recovery in this case, even though power recovery is not necessary, thereby worsening efficiency.

SUMMARY OF THE INVENTION

The present invention provides an address driving circuit for varying the power recovery operation of an address selecting circuit according to its switching variation.

The present invention discharges no residual voltage at a panel capacitor in the power recovery circuit.

In one aspect of the present invention, being a device for driving a PDP on which a plurality of first electrodes and a plurality of second electrodes are formed, a capacitive load being formed by the first electrode and the second electrode, the device comprises at least one inductor having a first terminal coupled to the first electrode and a second terminal coupled to a capacitor, at least one first switch, and a second switch. The first switch is coupled between the inductor and the capacitor or between the inductor and the first electrode, charges or discharges the capacitive load by a resonance of the capacitive load and the inductor by being turned on, and forms a first current path allowing a first energy to be discharged from the capacitor and a second current path allowing a second energy greater than the first energy to be charged in the capacitor. The second switch applies a first voltage to the first electrode after the capacitive load is charged by being turned on. The second energy includes an energy discharged from the capacitive load by the resonance of the capacitive load and the inductor, and the first energy includes an energy for charging the capacitive load by the resonance of the capacitive load and the inductor.

An energy is supplied to the capacitor from a first power for supplying the first voltage through the inductor before the capacitive load is discharged, and the second energy further includes an energy supplied from the first power.

The device further comprises: a first path formed by the capacitor, the inductor, and the first electrode for increasing a voltage of the first electrode; a second path formed by the first power and the first electrode for maintaining the voltage of the first electrode at the first voltage; a third path formed by the first power, the inductor, and the capacitor for supplying a current to the inductor; and a fourth path formed by the first electrode, the inductor, and the capacitor for reducing a voltage of the first electrode.

The device operates in the following order: a first period during which the capacitive load is charged through the voltage charged in the capacitor and the inductor; a second period during which a first electrode of the capacitive load is maintained at the first voltage through the first power; a third period during which a current is supplied to the inductor and the capacitor by using the first power; and a fourth period during which the capacitive load is discharged using the voltage charged in the capacitor and the inductor.

The second switch is coupled between the first power and a common node of the first terminal of the inductor and the first electrode, and the first switch includes a third switch and a fourth switch coupled in parallel between the second terminal of the inductor and the capacitor.

The second through fourth switches are transistors respectively, and each of such transistor include a body diode. The device further comprises: a first diode formed in the opposite direction of the body diode of the third switch in the path of the capacitor, the third switch, and the second terminal of the inductor; and a second diode formed in the opposite direction of the body diode of the fourth switch in the path of the capacitor, the fourth switch, and the second terminal of the inductor.

The device operates in the following order: a first period during which the first switch is turned on; a second period during which the third switch is turned on; a third period during which the second and third switches are turned on; and a fourth period during which the second switch is turned on.

The inductor includes a first indicator and a second inductor, and the device charges the capacitive load through the first inductor and discharges the capacitive load through the second inductor.

The inductor on the path of charging the capacitive load corresponds to the inductor on the path of discharging the capacitive load.

The first electrode is formed to cross the second electrode, and the second electrodes are sequentially selected, and discharge cells to be turned on are selected by a voltage applied to the selected second electrodes and the first electrodes during an address period.

The device further comprises a plurality of address selecting circuits coupled between the first terminal of the inductor and the first electrodes, and the address selecting circuit includes a fifth switch coupled between the first electrode and the first terminal of the inductor, and a sixth switch coupled between the first electrode and a second power for supplying a second voltage.

The discharge cells to be turned on are selected by the first electrodes coupled to the address selecting circuits of the turned-on fifth switches and the second electrodes from among the address selecting circuits.

The capacitor is substantially charged with the first voltage when the fifth switches of the address selecting circuits are turned on while the second electrodes are sequentially selected.

The capacitor is charged with a voltage between half of the first voltage and the first voltage.

The voltage at the capacitor is variable.

In another aspect of the present invention, in a method for driving a PDP on which a plurality of first electrodes and second electrodes are formed, a capacitive load being formed by the first and second electrodes, the method comprises: (a) selecting a first electrode to which a first voltage will be programmed from among the first electrodes, and increasing the voltage of the first electrode selected through a first inductor having a first terminal coupled to the first electrode; (b) substantially maintaining the voltage of the selected first electrode at the first voltage; (c) supplying a current to a second inductor coupled to the first electrode while substantially maintaining the voltage of the selected first electrode at the first voltage; and (d) reducing the voltage of the selected first electrode through the second inductor.

A capacitor is coupled to a second terminal of the first inductor and a second terminal of the second inductor when the voltage of the first electrode is increased and reduced.

The capacitor is discharged when the voltage of the first electrode is increased through the first inductor, and the capacitor is charged when the current is supplied to the second inductor and the voltage of the first electrode is reduced through the second inductor.

The first and second inductors may be the same, or the first and second inductors may be different.

The first electrode is an address electrode, and the second electrode is a scan electrode.

A second voltage is sequentially applied to the second electrodes, steps (a) through (d) above are repeated each time the second voltage is sequentially applied to the second electrodes, and the voltage of the capacitor is varied according to a combination of a previously selected first electrode and a currently selected first electrode.

The voltage at the capacitor substantially corresponds to the first voltage when a predetermined number of first electrodes are continuously selected.

In still another aspect of the present invention, a plasma display device comprises: a panel including a plurality of first electrodes provided in one direction and a plurality of second electrodes crossing the first electrodes; a first driving circuit for sequentially applying a first voltage to the first electrodes; a selecting circuit coupled to the second electrodes for selecting second electrodes from among the second electrodes to which data will be applied; and a second driving circuit, including at least one inductor coupled to the selecting circuit and a capacitor coupled to the inductor through a switch, for applying a second voltage to the second electrode selected by the selecting circuit, charging a capacitive load formed by the selected second electrode and the first electrode through the capacitor and the inductor, and discharging the capacitive load through the capacitor and the inductor. The selecting circuit discharges a residual voltage after the capacitive load is discharged through the capacitor and the inductor is discharged by an operation of the selecting circuit.

The second driving circuit supplies a current to the capacitor before discharging the capacitive load.

The second driving circuit applies the second voltage to the second electrode after the capacitive load is charged.

The selecting circuit includes a first switch coupled between the inductor and the second electrode, and a second switch coupled between the second electrode and the third voltage, and the second electrode is selected when the first switch is turned on.

The second switch of the selecting circuit coupled to the second electrode that is not selected is turned on to discharge the residual voltage of the capacitive load.

In yet another aspect of the present invention, an energy charged in the capacitor is greater than an energy discharged from the capacitor while the capacitive load is charged and discharged.

A residual voltage of the capacitive load after the capacitive load is discharged is discharged by driving the select circuit.

The current is supplied to the capacitor from a power through the inductor before the capacitive load is discharged.

The voltage of the capacitor is varied according to a pattern of the second electrode selected from the selecting circuit, while the first electrodes are sequentially selected.

The voltage of the capacitor substantially approximates the second voltage when a predetermined number of second electrodes are continuously selected in the selecting circuit while the first electrodes are sequentially selected.

The discharge amount of the capacitive load is reduced when a predetermined number of second electrodes are continuously selected in the selecting circuit while the first electrodes are sequentially selected.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only exemplary embodiment of the invention has been shown and described, simply illustrating the best mode contemplated by the inventor(s) of carrying out the invention. As will be realized, the invention is capable of modification in various obvious respects, all without departing from the spirit of the invention. Accordingly, the drawings and description are to be regarded as illustrative in nature, and not restrictive.

A plasma display device, a PDP driver, and a PDP driving method will be described in detail with reference to the drawings.

Figure 1:
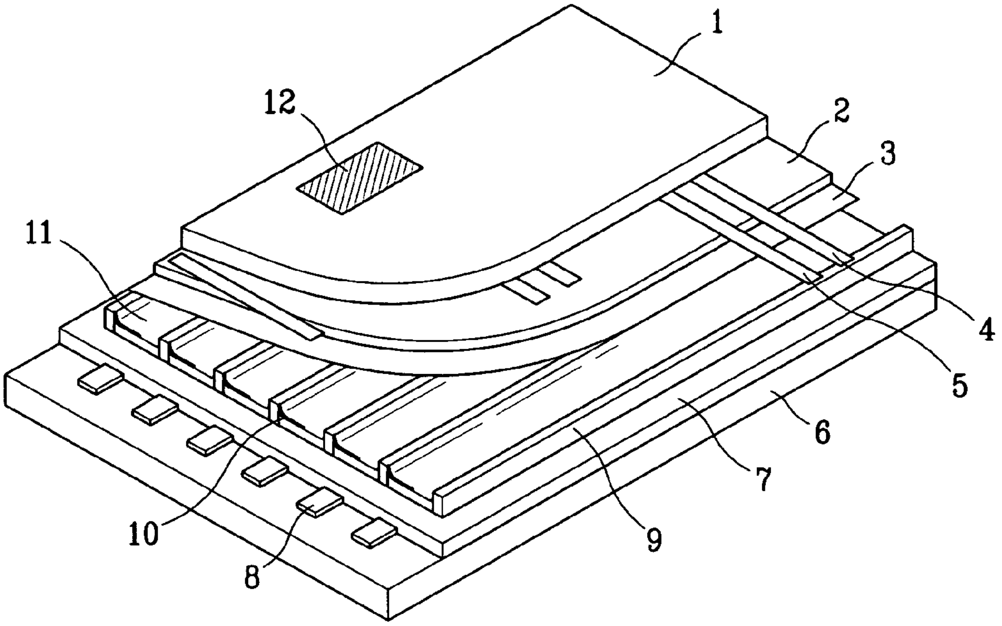
FIG. 1 shows a partial perspective view of an AC PDP.
Figure 2:
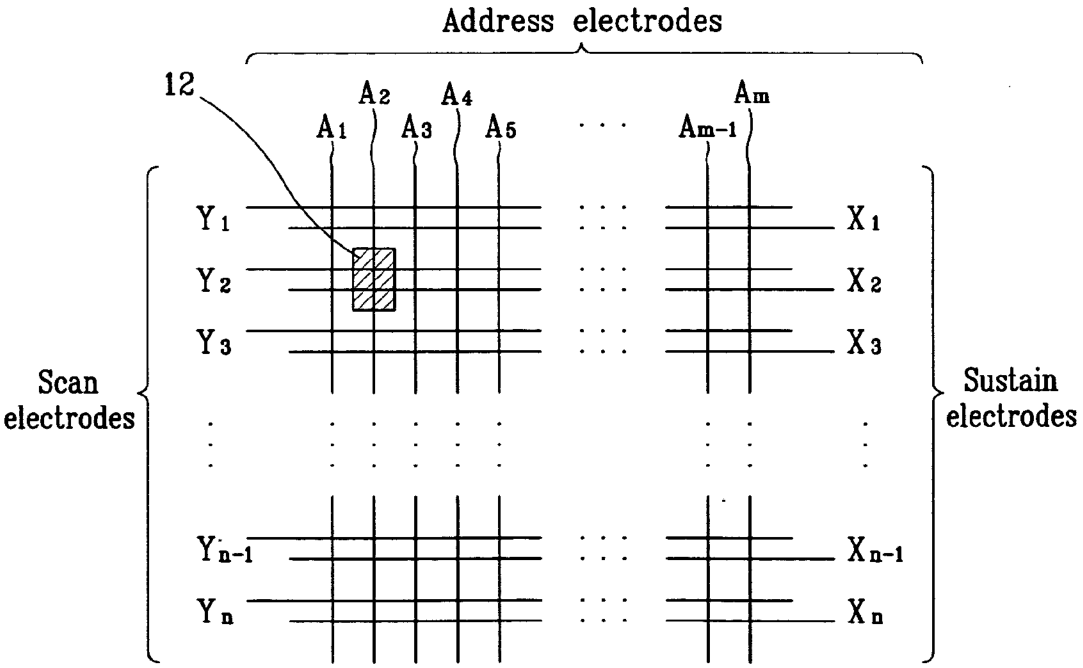
FIG. 2 shows a PDP electrode arrangement diagram.
Figure 3:
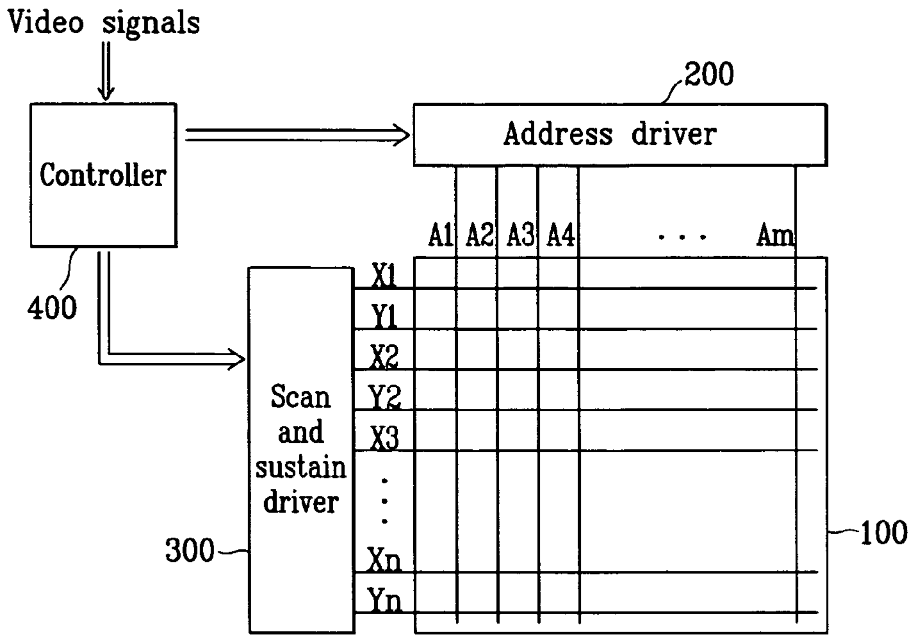
FIG. 3 shows a brief diagram of a plasma display device according to a preferred embodiment of the present invention.

FIG. 3 shows a brief diagram of a plasma display device according to a preferred embodiment of the present invention.

As shown, the plasma display device comprises a PDP 100, an address driver 200, a scan and sustain driver 300, and a controller 400. The scan and sustain driver 300 is illustrated as a single block in FIG. 3, but it can also be separated into a scan driver and a sustain driver.

The PDP 100 comprises a plurality of address electrodes $A_1$ to $A_m$ provided in the column direction, and a plurality of scan electrodes $Y_1$ to $Y_n$ and a plurality of sustain electrodes $X_1$ to $X_n$ provided in pairs in the row direction. The address driver 200 receives an address drive control signal from the controller 400, and applies address signals to the respective address electrodes $A_1$ to $A_m$ for selecting discharge cells to be displayed. The scan and sustain driver 300 receives a sustain control signal from the controller 400, and alternately inputs sustain pulses to the scan electrodes $Y_1$ to $Y_n$ and sustain electrodes $X_1$ to $X_n$ to sustain the selected discharge cells. The controller 400 receives external video signals, generates an address drive control signal and a sustain control signal, and applies them to the address driver 200 and the scan and sustain driver 300.

In general, a single frame is divided into a plurality of subfields, the subfields are driven in the PDP, and the discharge cells to be discharged are selected from among the discharge cells. In order to select the discharge cells, a scan voltage is sequentially applied to the scan electrodes, and the scan electrodes to which no scan voltage is applied are biased with a positive voltage in the address period. The voltage for addressing (referred to as an address voltage hereinafter) is applied to the address electrodes that are passed through the discharge cells to be selected from among a plurality of discharge cells formed by the scan electrodes to which the scan voltage is applied, and a reference voltage is applied to the address electrodes that are not selected. In general, the address voltage uses a positive voltage and the scan voltage uses a ground voltage or a negative voltage so that a discharge is generated at the address electrodes to which the address voltage is applied and the scan electrodes to which the scan voltage is applied, and the corresponding discharge cells are selected. The ground voltage is frequently used as the reference voltage.

An address driving circuit in the address driver 200 will be described with reference to FIG. 4 by assuming the scan voltage applied to the scan electrodes and the reference voltage applied to the address electrodes as the ground voltage.

Figure 4:
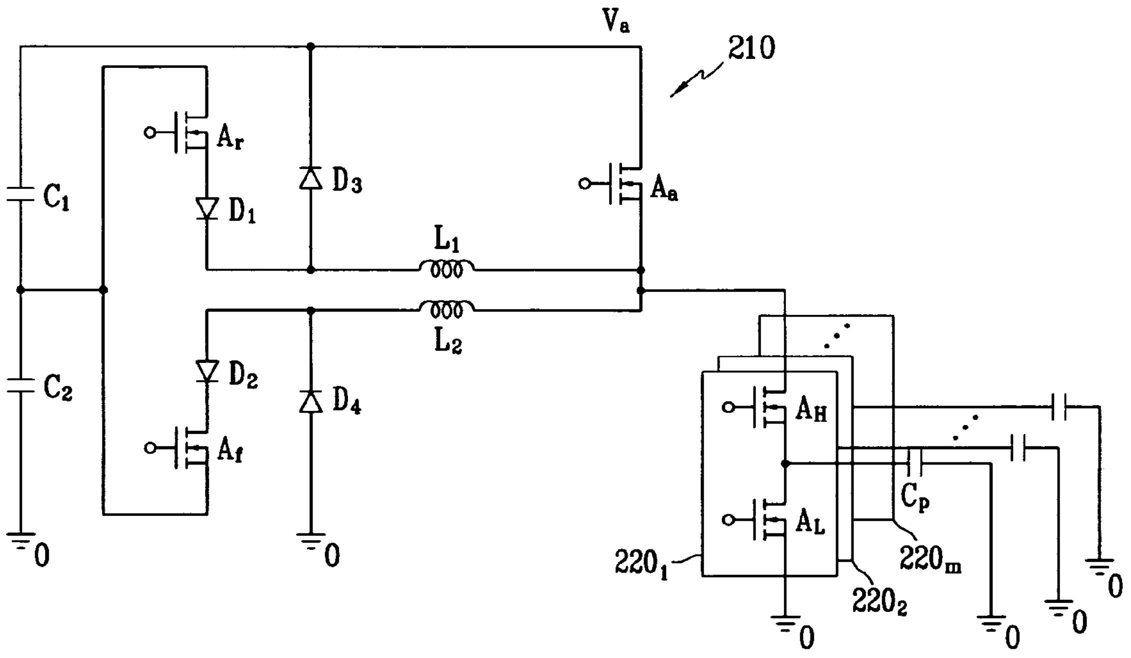
FIG. 4 shows an address driving circuit according to a first preferred embodiment of the present invention.

FIG. 4 shows an address driving circuit according to a first preferred embodiment of the present invention.

As shown, the address driving circuit comprises a power recovery circuit 210 and a plurality of address selecting circuits $\mathbf{220}_1$ to $\mathbf{220}_m$. The address selecting circuits $\mathbf{220}_1$ to $\mathbf{220}_m$ are respectively connected to a plurality of address electrodes $A_1$ to $A_m$, and each address selecting circuit has two switches $A_H$ and $A_L$. Switches $A_H$ and $A_L$ include a field-effect transistor (FET) having a body diode and other types of switches that perform the same or similar functions as the FET. In FIG. 4, each of switches $A_H$ and $A_L$ is composed of an N-channel MOSFET. A first terminal (drain) of switch $A_H$ is connected to the power recovery circuit 210 and a second terminal (source) of the switch $A_H$ is connected to the address electrodes $A_1$ to $A_m$, and when switch $A_H$ is turned on, an address voltage $V_a$ supplied by the power recovery circuit 210 is transmitted to the address electrodes $A_1$ to $A_m$. Switch $A_L$ has a first terminal (drain) connected to the address electrodes $A_1$ to $A_m$ and a second terminal (source) connected to the reference voltage (ground voltage), and when switch $A_L$ is turned on, the ground voltage is transmitted to the address electrodes $A_1$ to $A_m$. In addition, switches $A_H$ and $A_L$ are not simultaneously turned on.

The address voltage $V_a$ or the ground voltage is applied to the address electrodes $A_1$ to $A_m$ when switches $A_H$ and $A_L$ of the address selecting circuits $\mathbf{220}_1$ to $\mathbf{220}_m$ respectively connected to the address electrodes $A_1$ to $A_m$ are turned on or off by a control signal as described above. During the address period, the address electrode to which the address voltage $V_a$ is applied when switch $A_H$ is turned on is selected, and the address electrode to which the ground voltage is applied when switch $A_L$ is turned on is not selected.

The power recovery circuit 210 comprises switches $A_a$, $A_r$, and $A_f$, inductors $L_1$ and $L_2$, diodes $D_1$ and $D_2$, and capacitors $C_1$ and $C_2$. Switches $A_a$, $A_r$, and $A_f$ respectivel an FET having a body diode and other types of switches that perform the same or similar functions as the FET. In FIG. 4, each of the switches $A_a$, $A_r$, and $A_f$ is composed of an N-channel MOSFET. A first terminal (drain) of switch $A_a$ is connected to a power (or a power cable) for supplying the address voltage $V_a$ and a second terminal (source) of switch $A_a$ is connected to the first terminal of switch $A_H$ of the address selecting circuits $\mathbf{220}_1$ to $\mathbf{220}_m$. Capacitors $C_1$ and $C_2$ are connected in series between a power for supplying the address voltage $V_a$ and the ground voltage. The first terminal of switch $A_H$ of the address selecting circuits $\mathbf{220}_1$ to $\mathbf{220}_m$ is connected to first terminals of inductors $L_1$ and $L_2$. Switch $A_r$ and diode $D_1$ are connected in series between a common node of capacitors $C_1$ and $C_2$ and the second terminal of inductor $L_1$, and diode $D_2$ and switch $A_r$ are connected in series between the second terminal of inductor $L_2$ and the common node of capacitors $C_1$ and $C_2$.

In this instance, the connection sequence of inductor $L_1$, diode $D_1$, and switch $A_r$ can be changed, and the connection sequence of the inductor $L_2$, the diode $D_2$, and the switch $A_f$ can be changed. Diodes $D_1$ and $D_2$ prevent current paths that may be caused by a body diode formed at the respective switches $A_r$ and $A_f$, and the diodes can be eliminated if no body diode exists. A clamping diode $D_3$ can be connected between the second terminal of inductor $L_1$ and the power for supplying the address voltage $V_a$ so that the voltage applied to the address electrodes $A_1$ to $A_m$ may not exceed the address voltage $V_a$ during the operation of the power recovery circuit 210. In the same manner, a clamping diode $D_4$ can be connected between the ground voltage and the second terminal of inductor $L_2$ so that the voltage applied to the address electrodes $A_1$ to $A_m$ may not be less than the ground voltage.

A single power recovery circuit 210 is illustrated to be connected to the address selecting circuits $\mathbf{220}_1$ to $\mathbf{220}_m$ in FIG. 4. In addition, the address selecting circuits $\mathbf{220}_1$ to $\mathbf{220}_m$ can be divided into a plurality of groups, with a power recovery circuit 210 connected to each group. Capacitors $C_1$ and $C_2$ are connected in series between the power source that supplies the address voltage $V_a$ and the ground voltage in FIG. 4. Capacitor C, can further be eliminated.

Referring to FIGS. 5 through 12D, an operation of the address driving circuit according to an exemplary embodiment of the present invention will be described. The threshold voltage of a semiconductor element (switch or diode) is assumed to be 0V as the threshold voltage is much lower than the discharge voltage.

Figure 5:
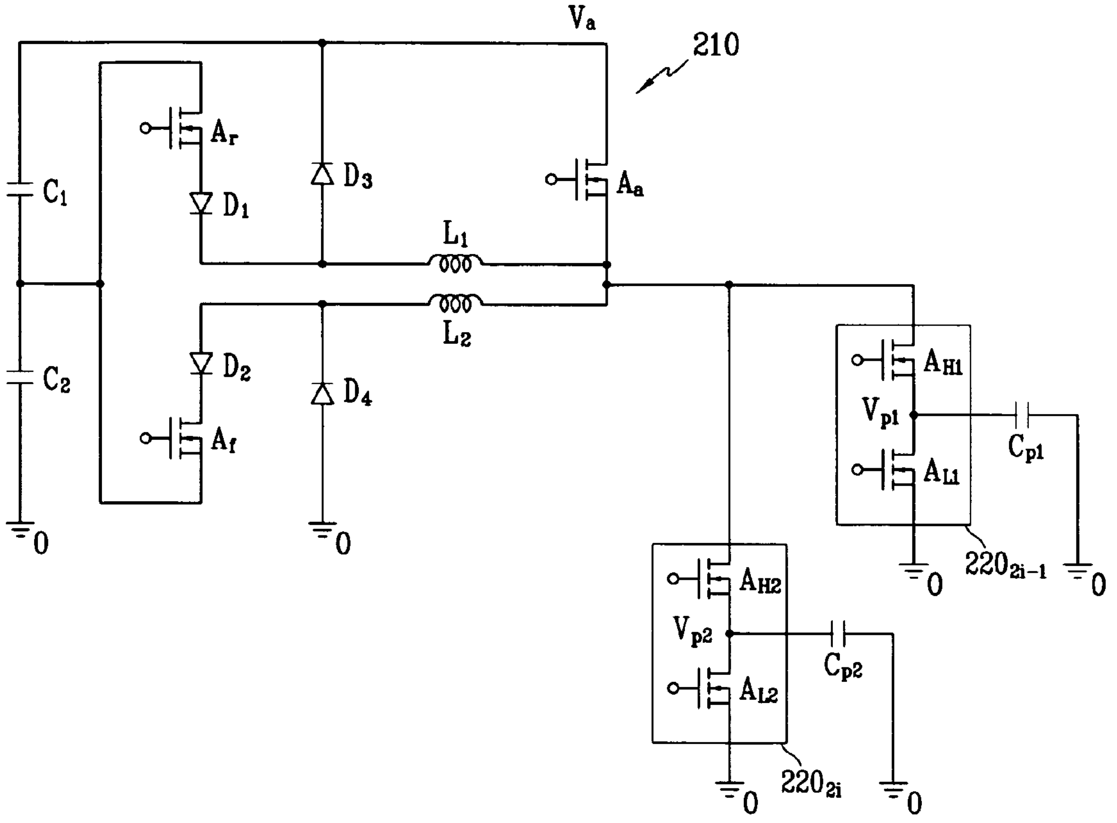
FIG. 5 shows an expanded diagram of the address driving circuit of FIG. 4.

FIG. 5 shows a brief diagram of the address driving circuit of FIG. 4. For ease of description, only two adjacent address selecting circuits $\mathbf{220}_{2i-1}$ and $\mathbf{220}_{2i}$ are illustrated. Also for ease of description, a capacitive component formed by the address electrode and the scan electrode is illustrated as a panel capacitor, and the ground voltage is applied to the scan electrode part of the panel capacitor.

As shown, the power recovery circuit 210 is connected to panel capacitors $C_{p1}$ and $C_{p2}$ through switches $A_{H1}$ and $A_{H2}$ of the address selecting circuits $\mathbf{220}_{2i-1}$ and $\mathbf{220}_{2i}$, and switches $A_{L1}$ and $A_{L2}$ of the address selecting circuits $\mathbf{220}_{2i-1}$ and $\mathbf{220}_{2i}$ are connected to the ground voltage. Panel capacitor $C_{p1}$ is a capacitive component formed by the address electrode $A_{2i-1}$ and the scan electrode, and panel capacitor $C_{p2}$ is a capacitive component formed by the address electrode $A_{2i}$ and the scan electrode.

An operation of the address driving circuit will be described by using representative patterns of FIGS. 6 through 8 displayed on a screen in a single subfield. The representative patterns include the dot on/off pattern, the line on/off pattern having many switching variations of the address selecting circuits $\mathbf{220}_1$ to $\mathbf{220}_m$, and the full white pattern having fewer switching variations of the address selecting circuits $\mathbf{220}_1$ to $\mathbf{220}_m$.

Figure 6:
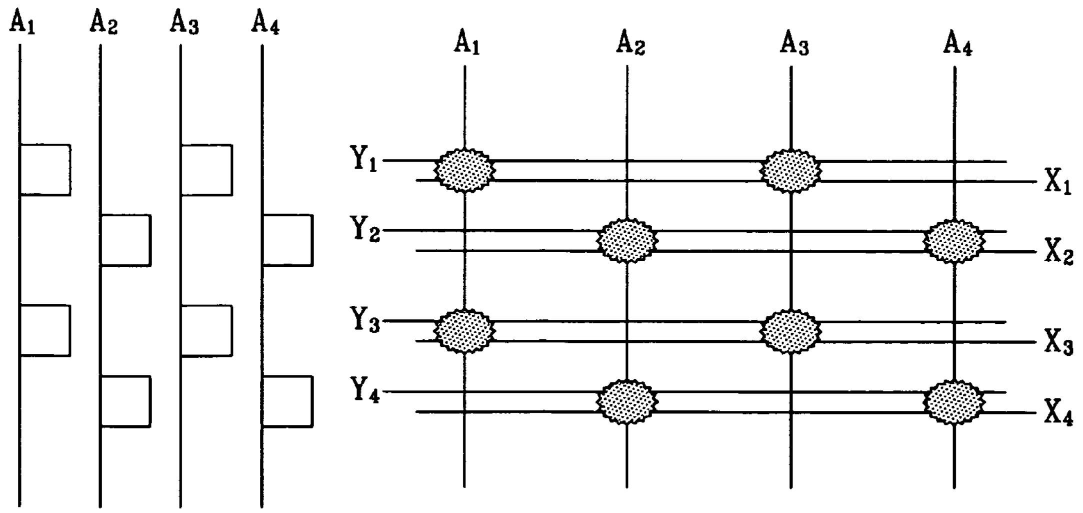
FIG. 6 shows a diagram of a dot on/off pattern.
Figure 7:
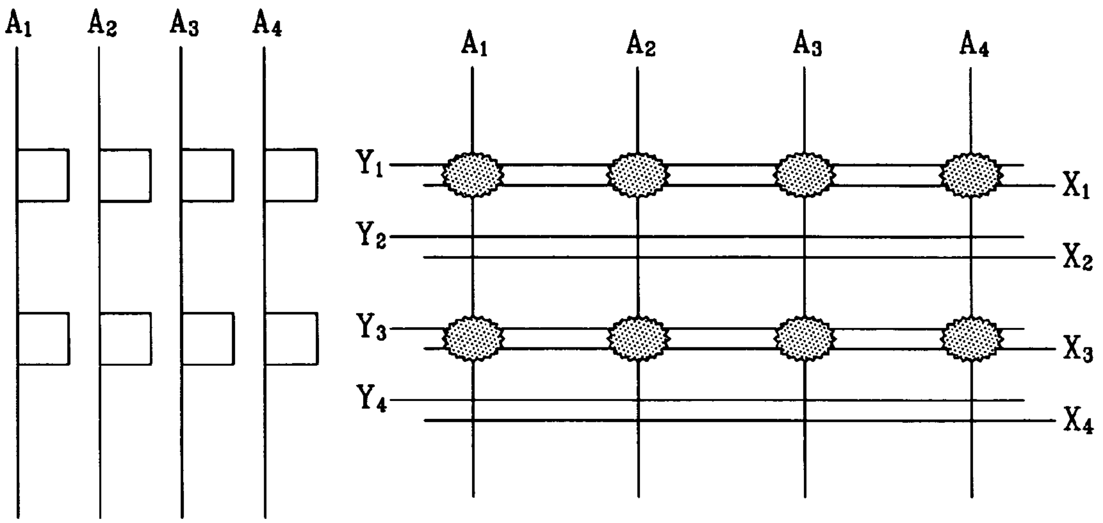
FIG. 7 shows a diagram of a line on/off pattern.
Figure 8:
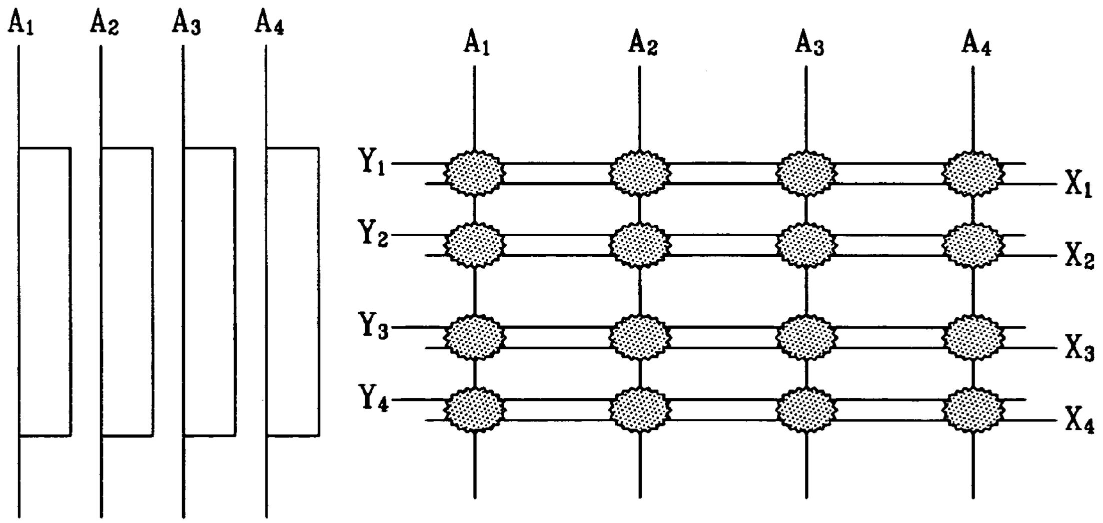
FIG. 8 shows a diagram of a full white pattern.

FIGS. 6, 7 and 8 respectively show concept diagrams of the dot on/off pattern, the line on/off pattern, and the full white pattern.

The pattern is determined by the switching operation of the address selecting circuits $\mathbf{220}_1$ to $\mathbf{220}_m$, and the timing of switches $A_a$, $A_r$, and $A_f$ of the power recovery circuit 210 is the same in any case of realizing the patterns. The switching variation of the address selecting circuit represents an operation in which turn-on and turn-off operations of switches $A_H$ and $A_L$ of the address selecting circuit are repeated when the scan electrodes are sequentially selected. That is, when the scan electrodes are sequentially selected, many switching variations of the address selecting circuit are generated if the address voltage and the ground voltage are alternately applied to the address electrode.

Referring to FIG. 6, the dot on/off pattern is a display pattern generated when the address voltage is alternately applied to the odd and even address electrodes as the scan electrodes are sequentially selected. For example, the address voltage is applied to the odd address electrodes $A_1$ and $A_3$ to select emission in the odd columns of the first row when the first scan electrode $Y_1$ is selected, and the address voltage is applied to the even address electrodes $A_2$ and $A_4$ to select emission in the even columns of the second row when the second scan electrode $Y_2$ is selected. Switch $A_H$ of the odd address selecting circuit is turned on and switch $A_L$ of the even address selecting circuit is turned on when scan electrode $Y_1$ is selected. Switch $A_H$ of the even address selecting circuit is turned on and switch $A_L$ of the odd address selecting circuit is turned on when scan electrode $Y_2$ is selected.

Referring to FIG. 7, the line on/off pattern is a pattern in which the address voltage is applied to all the address electrodes $A_1$, $A_2$, $A_3$ and $A_4$ when the first scan electrode $Y_1$ is selected, and no address voltage is applied to the address electrodes $A_1$, $A_2$, $A_3$ and $A_4$ when the second scan electrode $Y_2$ is selected. In this case, switches $A_H$ of all the address selecting circuits are turned on when scan electrode $Y_1$ is selected, and switches $A_L$ of all the address selecting circuits are turned on when scan electrode $Y_2$ is selected.

Referring to FIG. 8, the full white pattern is a display pattern generated when the address voltage is continuously applied to all the address electrodes as the scan electrodes are sequentially selected. Switches $A_H$ of all the address selecting circuits are always turned on.

Switches $A_L$ of the address selecting circuits are periodically turned on in both the dot on/off pattern and the line on/off pattern, but are not turned on in the full white pattern.

Turn-on states of switch $A_L$ determine the voltage at capacitor $C_2$ in the power recovery circuit of FIG. 5.

An operation of the address driving circuit of FIG. 5 will be described in detail using the dot on/off pattern and the full white pattern. The dot on/off pattern and the line on/off pattern perform similar functions regarding switches $A_L$, which are periodically turned on.

1. Dot On/Off Pattern

First, the temporal operation of the address driving circuit for displaying the dot on/off pattern with many switching variations of the address selecting circuits $\mathbf{220}_1$ to $\mathbf{220}_m$ will be described with reference to FIGS. 9 and 10A through 10H. The operation has eight sequential modes, which arise through manipulation of the switches. A resonance phenomenon arises, but is not a continuous oscillation. Instead, it is a voltage and current variation caused by combination of an inductor $L_1$ or $L_2$ and a panel capacitor $C_{p1}$ or $C_{p2}$ when switches $A_r$ and $A_f$ are turned on.

Figure 9:
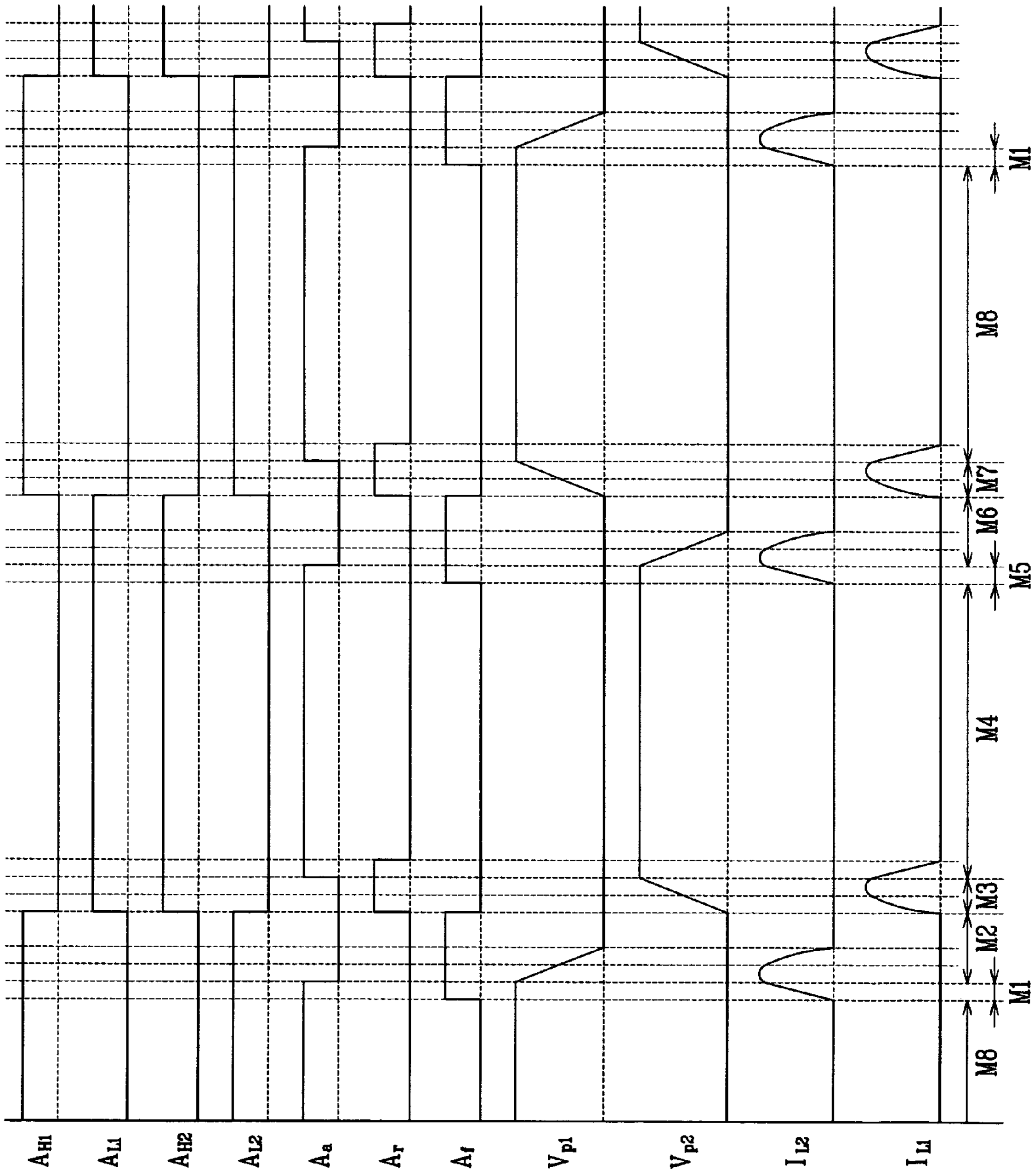
FIG. 9 shows a timing diagram of a power recovery circuit of FIG. 5 for showing a dot on/off pattern.

FIG. 9 shows a timing diagram of a power recovery circuit of FIG. 5 for showing the dot on/off pattern, and FIGS. 10A to 10H show current paths for respective modes of the address driving circuit of FIG. 5 following the timing of FIG. 9.

For a dot on/off pattern selected by the circuit of FIG. 5, when a single scan electrode is selected both switch $A_{H1}$ of address selecting circuit $\mathbf{220}_{2i-1}$ connected to odd address electrode $A_{2i-1}$ and switch $A_{L2}$ of address selecting circuit $\mathbf{220}_{2i}$ connected to even address electrode $A_{2i}$ are turned on. Both switch $A_{H2}$ of address selecting circuit $\mathbf{220}_{2i}$ and switch $A_{L1}$ of address selecting circuit $\mathbf{220}_{2i-1}$ are turned off. When the next scan electrode is selected, switches $A_{H1}$ and $A_{L2}$ are turned off and switches $A_{H2}$ and $A_{L1}$ are turned on. These alternating operations are repeated. When the dot on/off pattern is displayed as described above, switches $A_{H1}$ and $A_{H2}$ and switches $A_{L1}$ and $A_{L2}$ of address selecting circuits $\mathbf{220}_{2i-1}$ and $\mathbf{220}_{2i}$ are continuously turned on and off by synchronizing with the scan voltage sequentially applied to the scan electrodes.

It is assumed in FIG. 9 that switches $A_{H1}$, $A_{L2}$, and $A_a$ are turned on and switches $A_{H2}$ and $A_{L1}$ are turned off before Mode 1 starts so that a voltage $V_a$ is applied to panel capacitor $C_{p1}$ and a voltage 0V is applied to panel capacitor $C_{p2}$. The voltage $V_a$ is thus assumed to be applied to the odd address electrode $A_{2i-1}$, and the voltage 0V is assumed to be applied to the even address electrode $A_{2i}$.

Figure 10A:
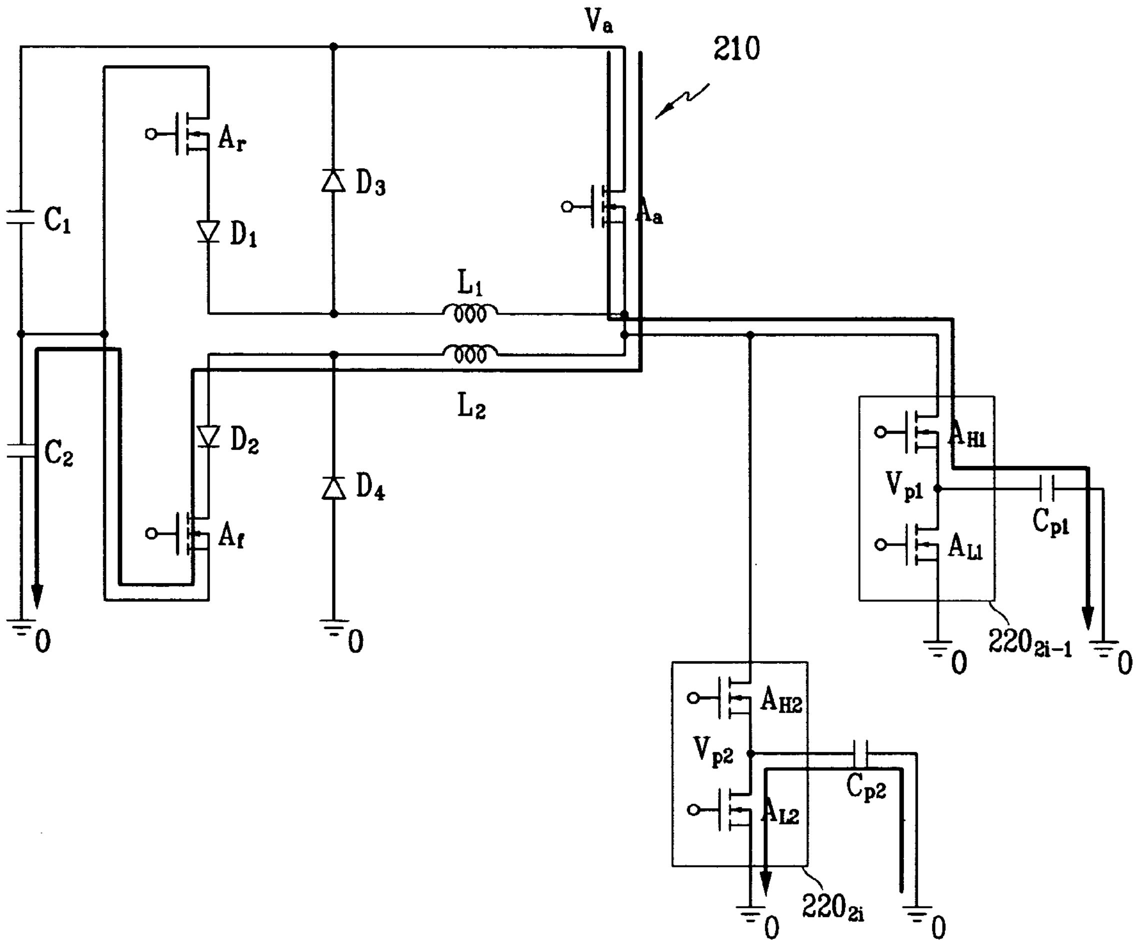
FIGS. 10A, 10B, 10C, 10D, 10E, 10F, 10G and 10H show current paths for respective modes of the address driving circuit of FIG. 5 following the timing of FIG. 9.

In Mode 1, switch $A_f$ is turned on while switches $A_{H1}$, $A_{L2}$, and $A_a$ are turned on and switches $A_{H2}$ and $A_{L1}$ are turned off. Then, as shown in FIG. 10A, current is injected into inductor $L_2$ and capacitor $C_2$ through the path of the power $V_a$, switch $A_a$, inductor $L_2$, diode $D_2$, switch $A_f$, and capacitor $C_2$, and charging capacitor $C_2$ with a voltage.

Figure 10B:
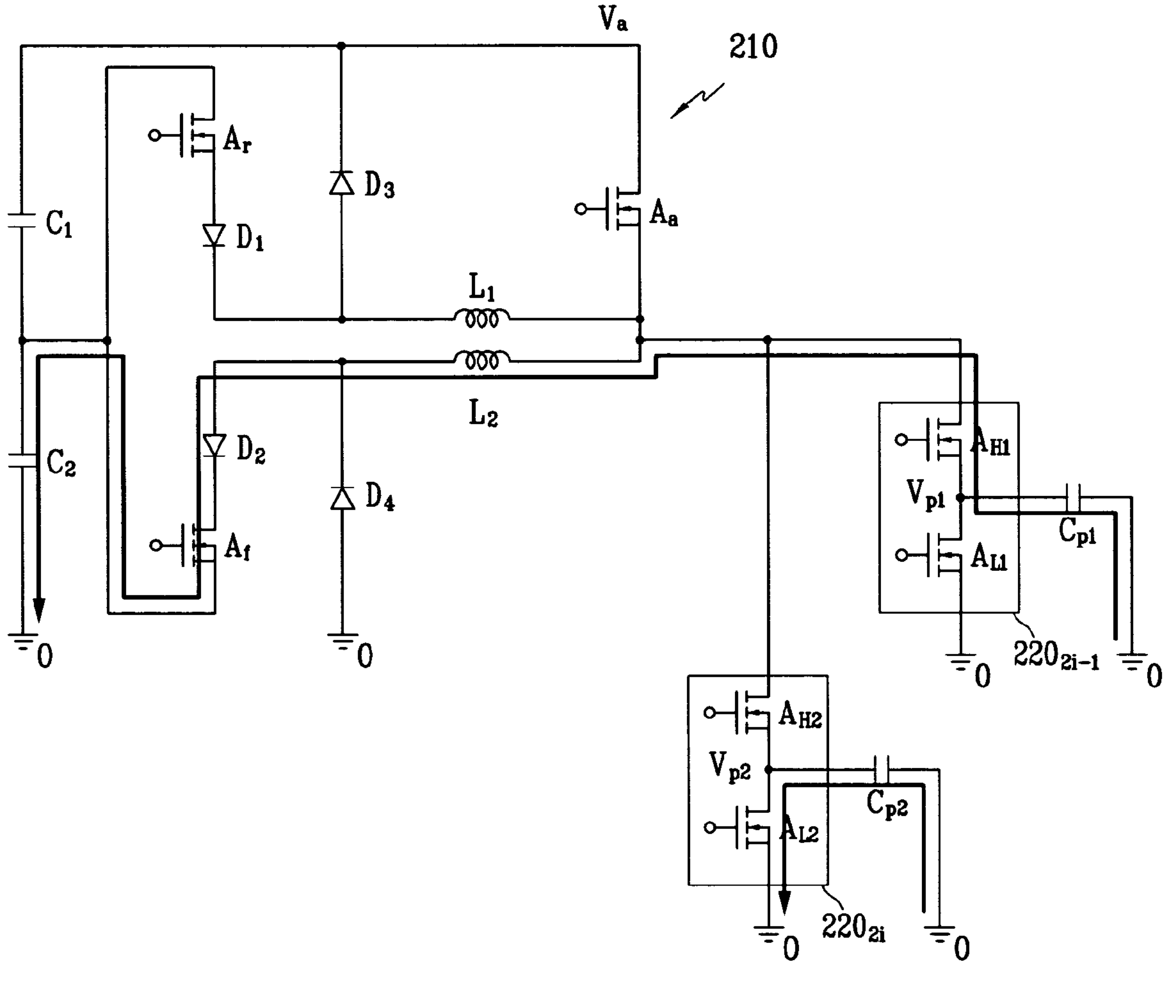

In Mode 2, switch $A_a$ is turned off to form a resonance path through panel capacitor $C_{p1}$, the body diode of switch $A_{H1}$, inductor $L_2$, diode $D_2$, switch $A_f$, and capacitor $C_2$ as shown in FIG. 10B. Voltage $V_{p1}$ at panel capacitor $C_{p1}$ is reduced by the resonance path, and voltage $V_{p2}$ at panel capacitor $C_{p2}$ is maintained at 0V because switch $A_{L2}$ is turned on. The current (energy) discharged from panel capacitor $C_{p1}$ is supplied to capacitor $C_2$, and charging capacitor $C_2$ with a voltage.

Figure 10C:
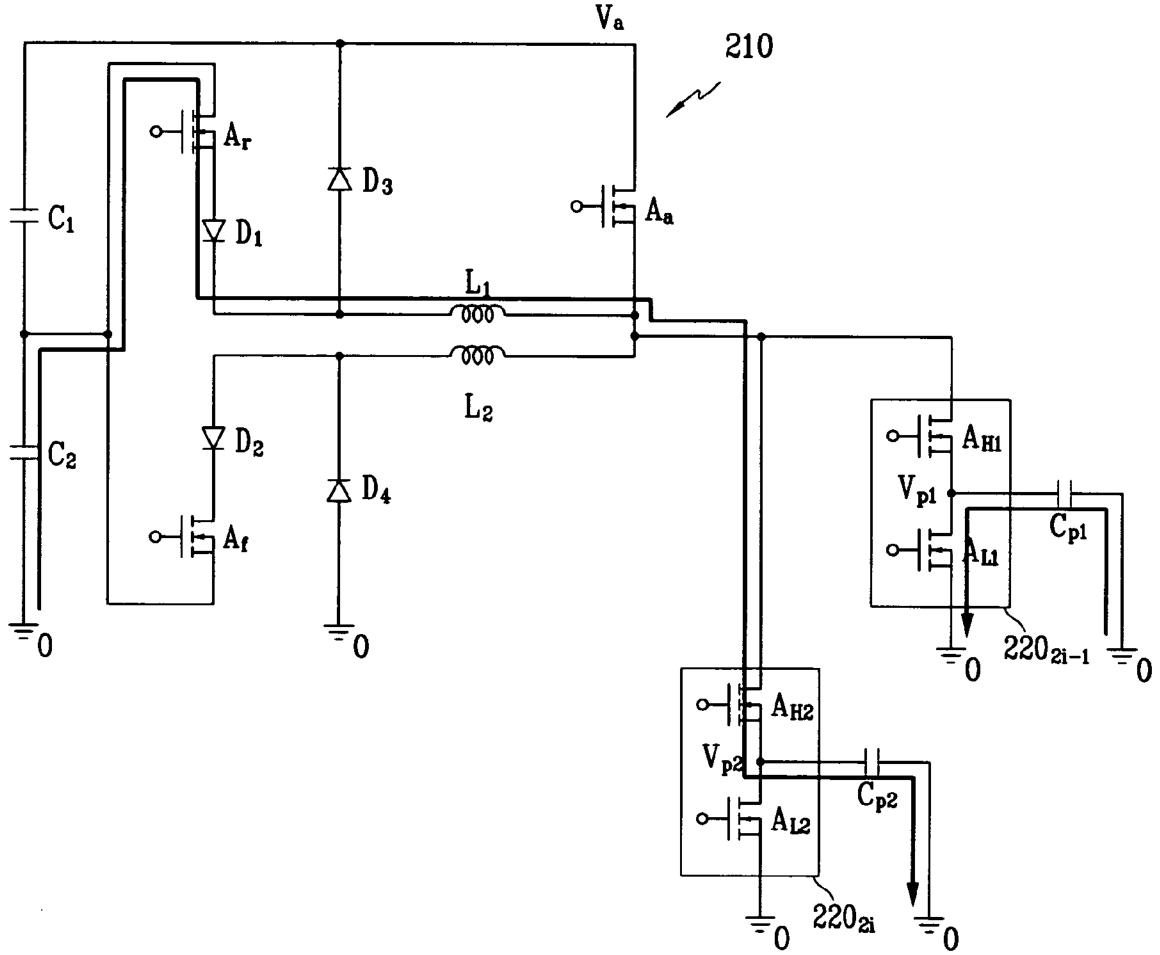

In Mode 3, switches $A_{H1}$ and $A_{L2}$ are turned off and switches $A_{H2}$ and $A_{L1}$ are turned on to apply a voltage 0V to panel capacitor $C_{p1}$. Switch $A_f$ is turned off and switch $A_r$ is turned on to form a resonance path through capacitor $C_2$, switch $A_r$, diode $D_1$, inductor $L_1$, switch $A_{H2}$, and panel capacitor $C_{p2}$ as shown in FIG. 10C. The current is supplied from capacitor $C_2$ by the resonance path to increase voltage $V_{p2}$ at panel capacitor $C_{p2}$ and discharge capacitor $C_2$. In this instance, voltage $V_{p2}$ at panel capacitor $C_{p2}$ does not exceed the voltage $V_a$ because the body diode of switch $A_a$ is turned on when voltage $V_{p2}$ at panel capacitor $C_{p2}$ exceeds the voltage $V_a$. The current remaining in inductor $L_1$ when the voltage at panel capacitor $C_{p2}$ reaches the voltage $V_a$ is freewheeled through the body diode of switch $A_a$.

Figure 10D:
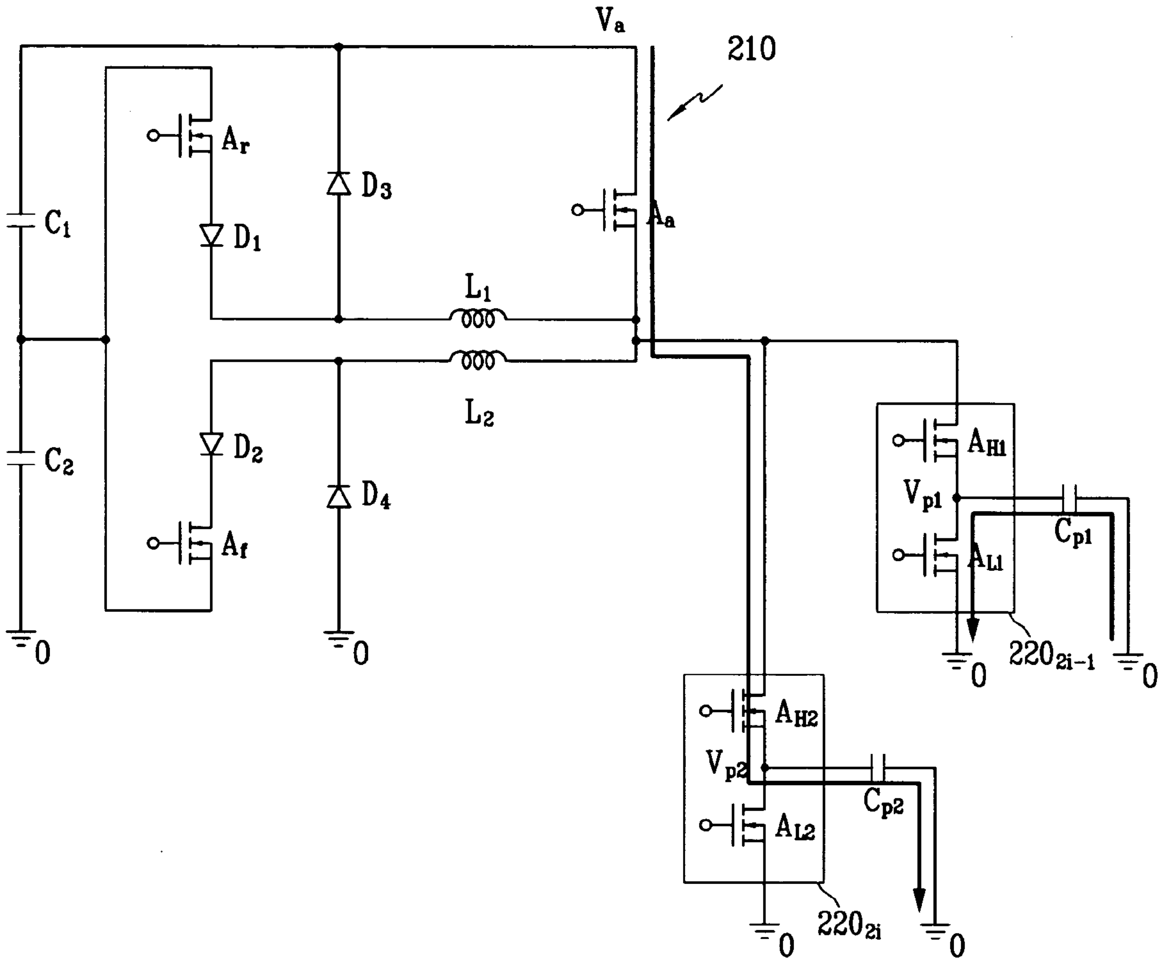

In Mode 4, switch $A_a$ is turned on and switch $A_r$ is turned off to maintain voltage $V_{p2}$ at panel capacitor $C_{p2}$ at the same level as voltage $V_a$, as shown in FIG. 10D.

As described above, during Modes 1, 2, 3 and 4 the power recovery circuit 210 supplies the voltage $V_a$ to the address electrode $A_{2i}$ through switch $A_{H2}$ of the address selecting circuit $\mathbf{220}_{2i}$. The address electrode $A_{2i-1}$ is maintained at 0V through switch $A_{L1}$ of the address selecting circuit $\mathbf{220}_{2i-1}$.

In Modes 5, 6, 7 and 8, the operation of the switches of the power recovery circuit is the same as that described above except for the operation of the switches of the address selecting circuit.

Figure 10E:
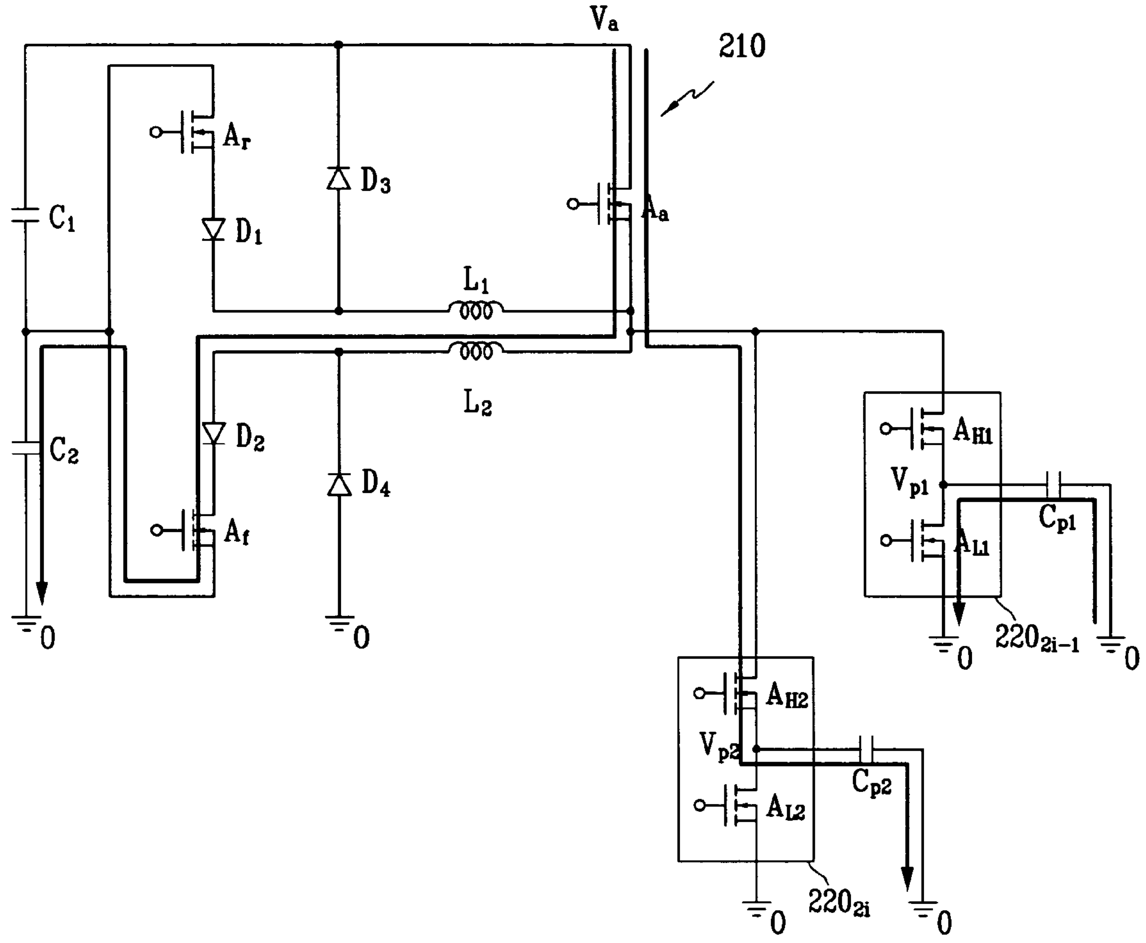

In Mode 5, switch $A_f$ is turned on while switches $A_{H2}$, $A_{L1}$, and $A_a$ are turned on and switches $A_{H1}$ and $A_{L2}$ are turned off. Hence, current is injected into inductor $L_2$ and capacitor $C_2$ through the path of the power $V_a$, switch $A_a$, inductor $L_2$, diode $D_2$, switch $A_f$ and the capacitor $C_2$ as shown in FIG. 10E, and charging capacitor $C_2$ with a voltage.

Figure 10F:
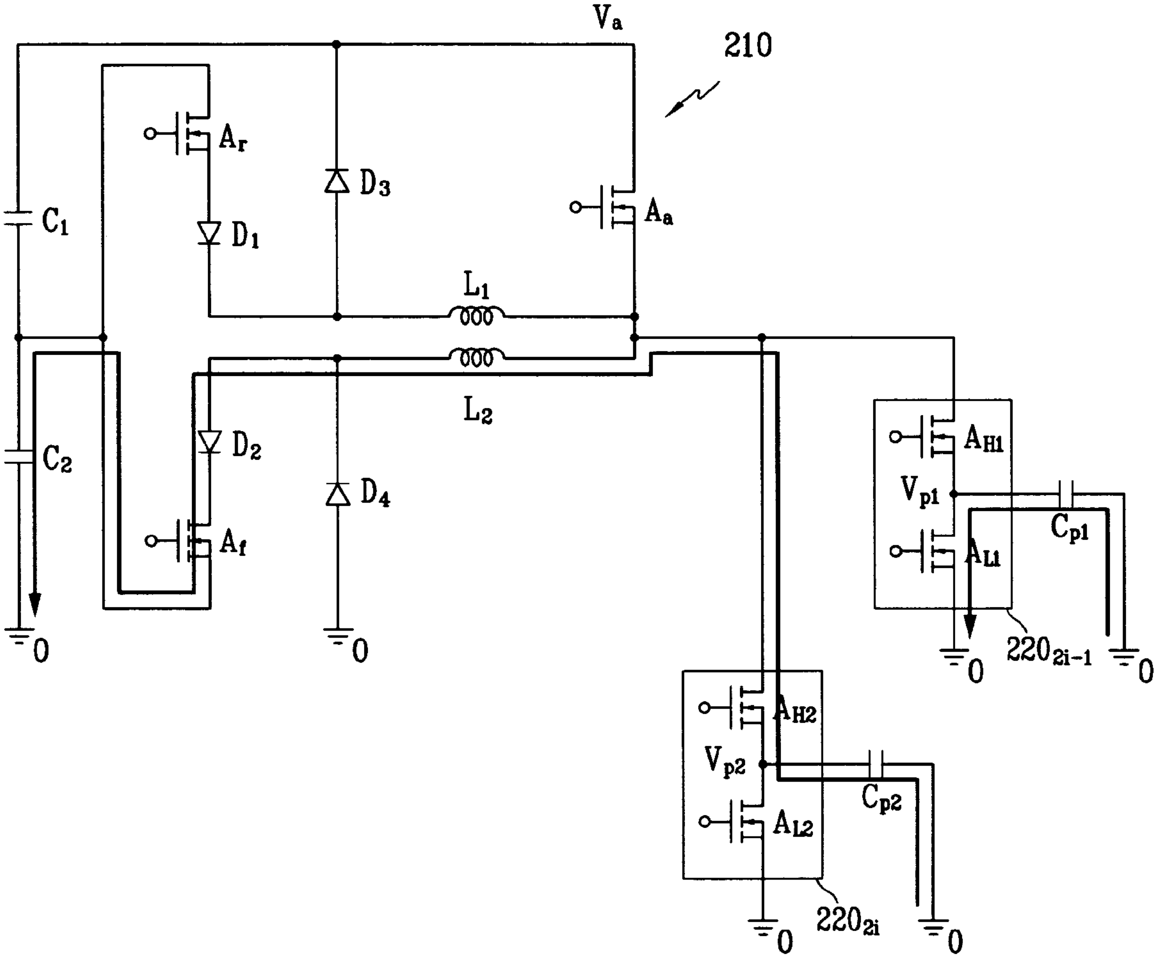

In Mode 6, switch $A_a$ is turned off to form a resonance path through panel capacitor $C_{p2}$, the body diode of switch $A_{H2}$, inductor $L_2$, diode $D_2$, switch $A_f$, and capacitor $C_2$ as shown in FIG. 10F. Voltage $V_{p2}$ at panel capacitor $C_{p2}$ is reduced by the resonance path, and voltage $V_{p1}$ at the panel capacitor $C_{p1}$ is maintained at 0V because switch $A_{L1}$ is turned on. The current (energy) discharged from panel capacitor $C_{p2}$ is supplied to capacitor $C_2$, and charging capacitor $C_2$ with a voltage.

Figure 10G:
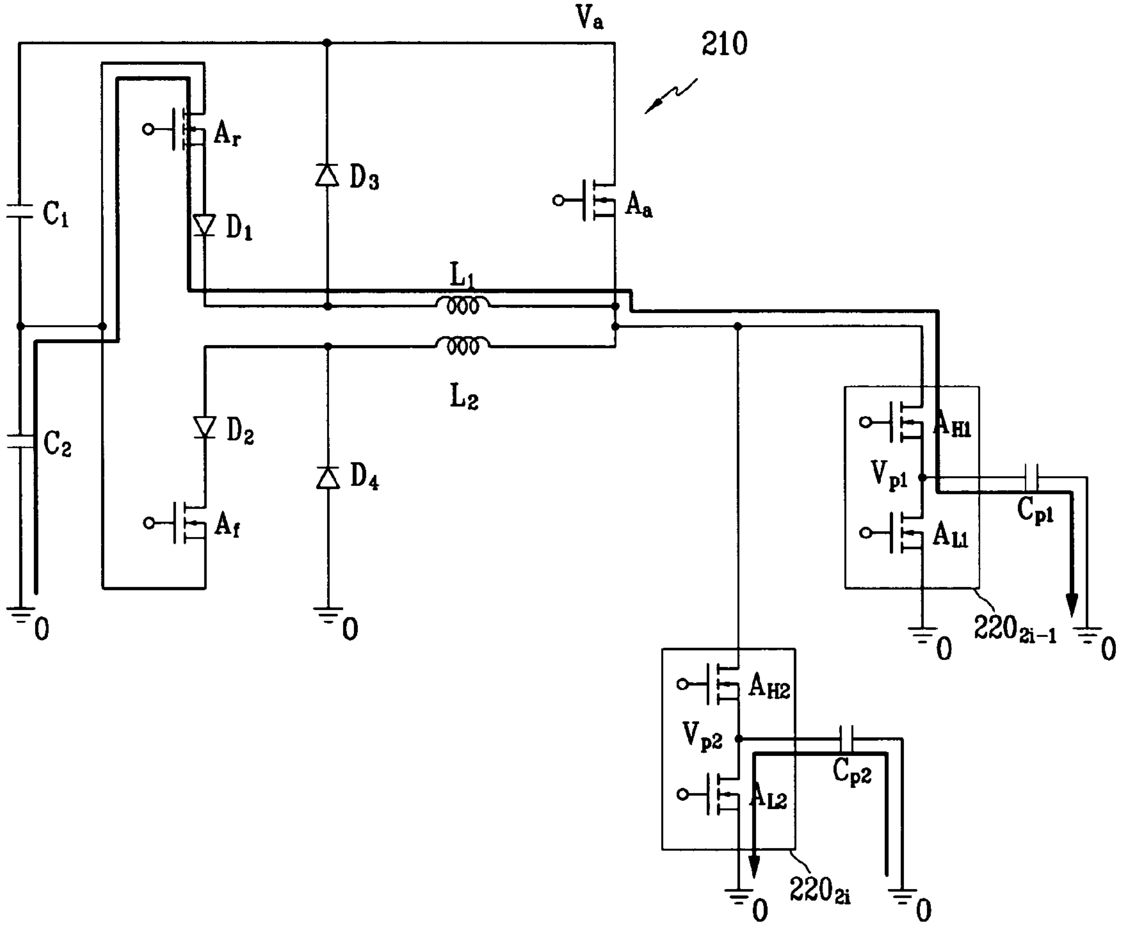

In Mode 7, switches $A_{H2}$ and $A_{L1}$ are turned off and switches $A_{H1}$ and $A_{L2}$ are turned on to apply a voltage of 0V to panel capacitor $C_{p2}$. Switch $A_f$ is turned off and switch $A_r$ is turned on to form a resonance path through capacitor $C_2$, switch $A_r$, diode $D_1$, inductor $L_1$, switch $A_{H2}$, and panel capacitor $C_{p1}$ as shown in FIG. 10G. Current is supplied from capacitor $C_2$ by the resonance path to increase the voltage $V_{p1}$ at panel capacitor $C_{p1}$ and discharge the capacitor $C_2$. Voltage $V_{p1}$ at panel capacitor $C_{p1}$ does not exceed the voltage $V_a$ because the body diode of switch $A_a$ is turned on when voltage $V_{p1}$ at panel capacitor $C_{p1}$ exceeds the voltage $V_a$. The current remaining in inductor $L_1$ after the voltage at panel capacitor $C_{p1}$ reaches the voltage $V_a$ is freewheeled through the body diode of switch $A_a$.

Figure 10H:
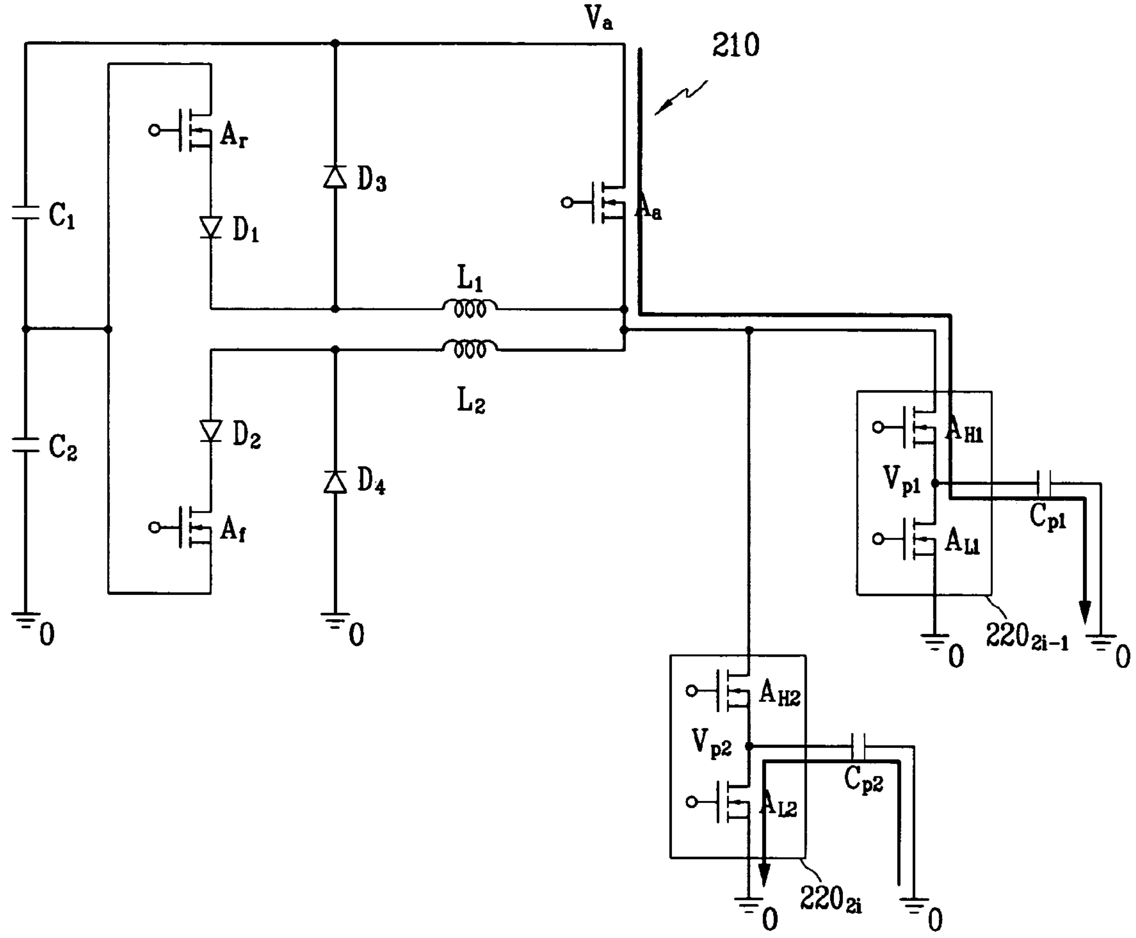

In Mode 8, switch $A_r$ is turned off and switch $A_a$ is turned on to maintain voltage $V_{p1}$ at panel capacitor $C_{p1}$ at the same level as the voltage $V_a$, as shown in FIG. 10H.

For Modes 5 through 8 as described, the power recovery circuit 210 supplies the voltage $V_a$ to the address electrode $A_{2i-1}$ through switch $A_{H1}$ of the address selecting circuit $\mathbf{220}_{2i-1}$. The address electrode $A_{2i}$ is maintained at 0V through switch $A_{L2}$ of the address selecting circuit $\mathbf{220}_{2i}$. The dot on/off pattern is realized by repeating the operation of Modes 1 through 8.

When capacitor $C_2$ is charged with a voltage $V_a/2$, and the capacitance of capacitor $C_2$ is large enough to function as a power source for supplying a voltage $V_a/2$ to capacitor $C_2$, panel capacitor $C_{p1}$ or $C_{p2}$ charged with a voltage $V_a$ in Mode 2 or 6 can be discharged to 0V by the LC resonance principle, and panel capacitor $C_{p1}$ or $C_{p2}$ discharged to 0V in Mode 3 or 7 can be charged to reach a voltage $V_a$.

First, in Mode 1, the current (energy) is supplied to the capacitor $C_2$ through inductor $L_2$ from the power $V_a$, and panel capacitor $C_{p1}$ is discharged to supply current (energy) to capacitor $C_2$ in Mode 2. Thus, capacitor $C_2$ is charged with energy to raise the voltage at capacitor $C_2$ by an amount ΔV1 in Modes 1 and 2. In Mode 3 current is supplied from capacitor $C_2$ through inductor $L_1$ to increase the voltage at panel capacitor $C_{p2}$ and freewheel the residual current. Energy is discharged from capacitor $C_2$ to reduce the voltage at capacitor $C_2$ by the amount ΔV2. Assuming that capacitor $C_2$ is charged with voltage $V_a/2$ in the earlier stage, the charge energy of capacitor $C_2$ is greater than the discharge energy of capacitor $C_2$ because energy is further supplied through the power $V_a$ in Mode 1 when charging capacitor $C_2$. In other words, ΔV1 is greater than ΔV2. The charge and discharge energy to and from capacitor $C_2$ in Modes 5 through 8 corresponds to the charge and discharge energy in Modes 1 to 4. Because panel capacitor $C_{p1}$ or $C_{p2}$ is discharged, its residual voltage reaches 0V, and the panel capacitor is charged again in Mode 3 or 7 (M3 or M7); the energy discharged from capacitor $C_2$ for charging panel capacitor $C_{p1}$ or $C_{p2}$ is substantially constant when Modes 1 through 8 are repeated.

When the charge energy of capacitor $C_2$ is greater than discharge energy thereof, and the voltage at capacitor $C_2$ increases, the energy charged into capacitor $C_2$ is reduced in Modes 1 and 2 or Modes 5 and 6. When the operations of Modes 1 through 8 are repeatedly performed, the charge energy of capacitor $C_2$ is reduced, so that the charge energy of capacitor $C_2$ and its discharge energy thereof finally become the same and reach an equilibrium state. The voltage charged in capacitor $C_2$ is greater than $V_a/2$ and less than $V_a$.

When the voltage charged in panel capacitor $C_2$ is greater than $V_a/2$, a voltage equal to twice the voltage of capacitor $C_2$ and therefore greater than $V_a$ can be charged in panel capacitors $C_{p1}$ and $C_{p2}$ by the resonance principle in Modes 3 and 7. Therefore, the voltages at panel capacitors $C_{p1}$ and $C_{p2}$ can rise to the voltage $V_a$ by the resonance principle even when a parasitic component is present in the address driving circuit, and switch $A_a$ can perform a zero-voltage switching operation.

2. Full White Pattern

The temporal operation of the address driving circuit for displaying a pattern with fewer switching variations of the address selecting circuits 220$_1$ to 220$_m$ than both the dot on/off pattern case and the line on/off pattern case will be described with reference to FIGS. 11 and 12A through 12D. The operation has four sequential modes, which arise through manipulation of the switches. A resonance phenomenon arises but is not a continuous oscillation. Instead, it is a voltage and current variation caused by combination of an inductor $L_1$ or $L_2$ and a panel capacitor $C_{p1}$ or $C_{p2}$ when switches $A_r$ and $A_f$ are turned on.

Figure 11:
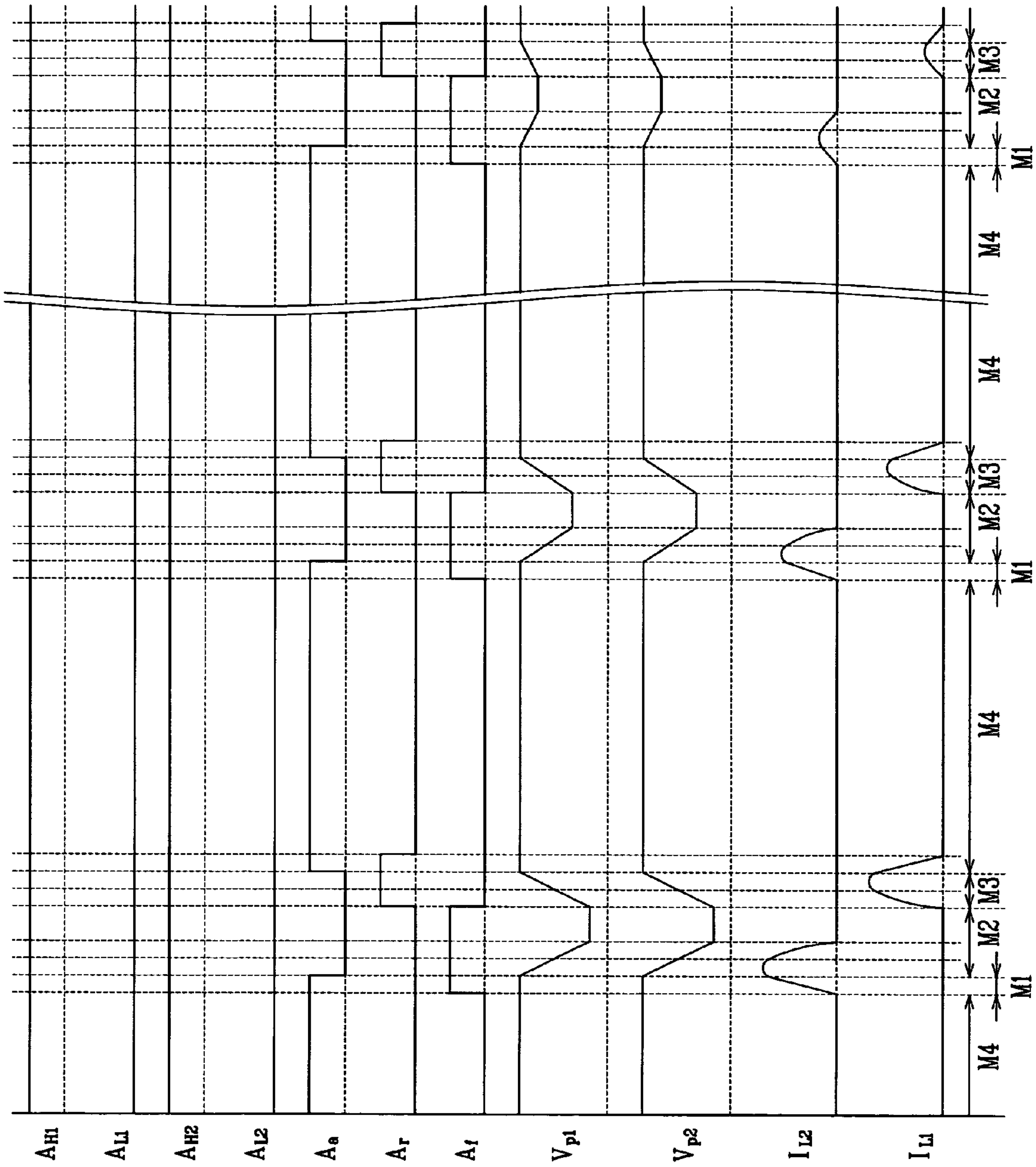
FIG. 11 shows a timing diagram of the power recovery circuit of FIG. 5 for showing a full white pattern.

FIG. 11 shows a timing diagram of a power recovery circuit of FIG. 5 for showing the full white pattern, and FIGS. 12A, 12B, 12C and 12D show current paths for respective modes of the address driving circuit of FIG. 5 following the timing of FIG. 11.

In displaying the full white pattern in the circuit of FIG. 5, switches $A_{H1}$ and $A_{H2}$ of the address selecting circuits 220$_{2i-1}$ and 220$_{2i}$ are always turned on while the scan electrodes are sequentially selected.

It is assumed in FIG. 11 that switches $A_{H1}$, $A_{H2}$, and $A_a$ are turned on before Mode 1 begins so that the voltage $V_a$ is applied to panel capacitors $C_{p1}$ an $C_{p2}$.

Figure 12A:
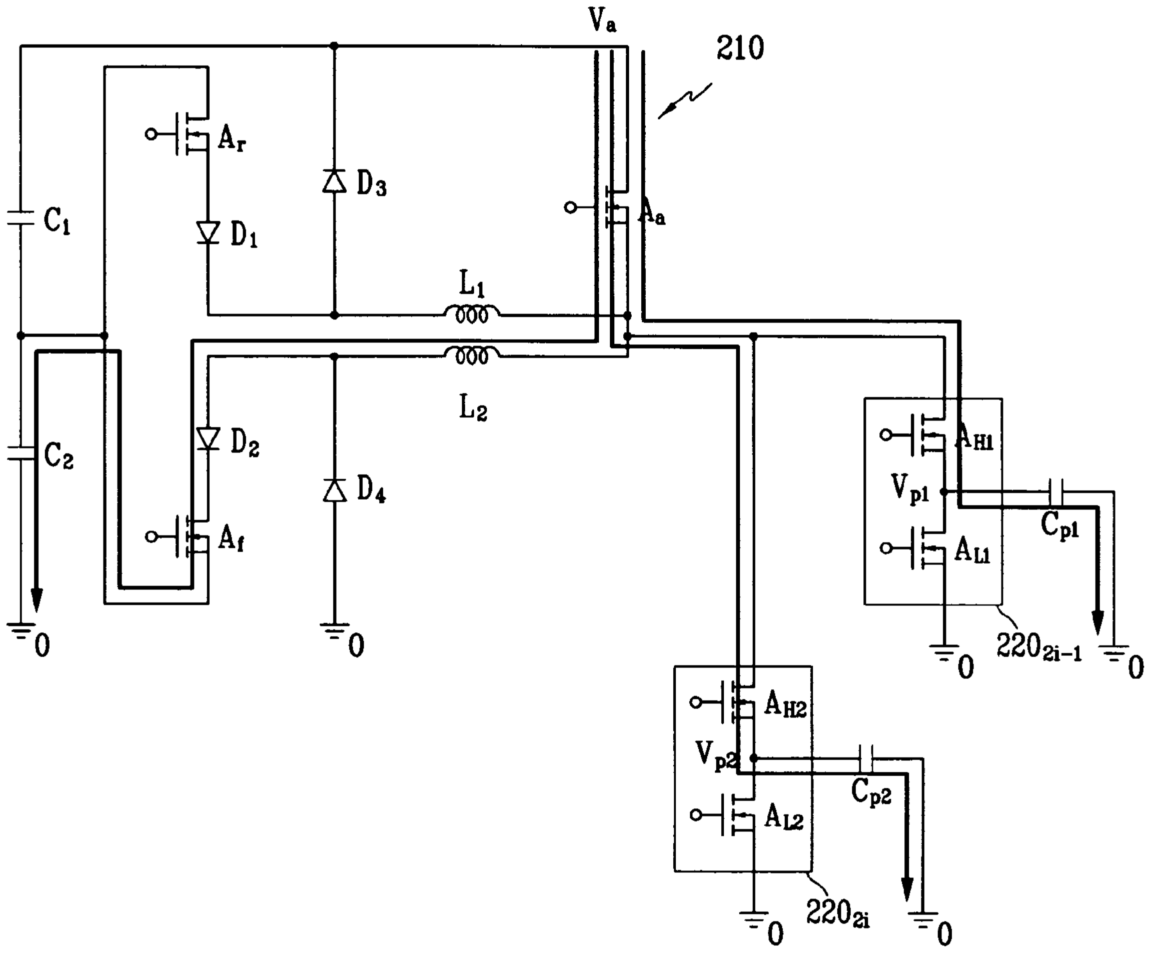
FIGS. 12A, 12B 12C and 12D show current paths for respective modes of the address driving circuit of FIG. 5 following the timing of FIG. 11.

In Mode 1, switch $A_f$ is turned on while switches $A_{H1}$, $A_{H2}$, and $A_a$ are turned on. As shown in FIG. 12A, current is injected into inductor $L_2$ and capacitor $C_2$ to charge capacitor $C_2$ with a voltage in the same manner as in Mode 1 of FIG. 9.

Figure 12B:
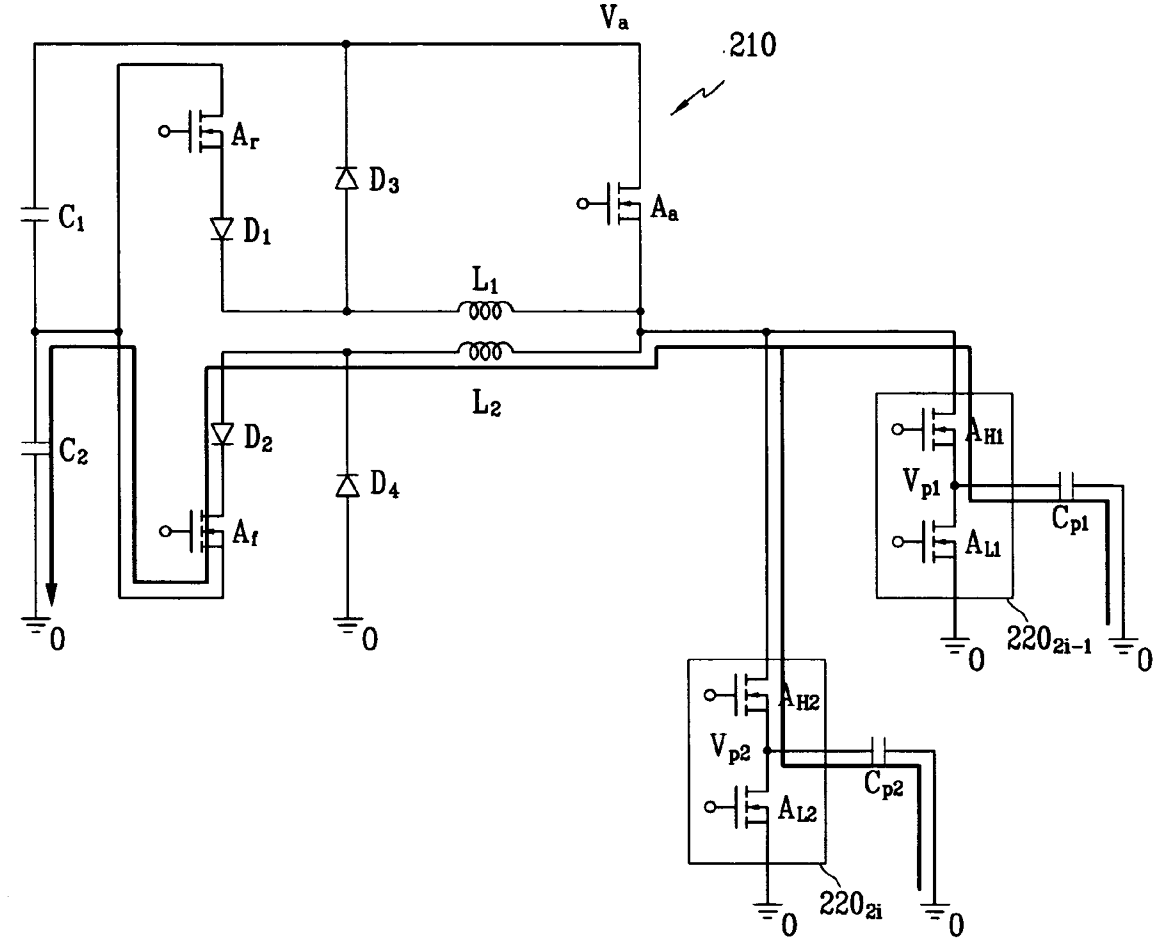

In Mode 2, switch $A_a$ is turned off to form a resonance path through panel capacitors $C_{p1}$ and $C_{p2}$, the body diodes of switches $A_{H1}$ and $A_{H2}$, inductor $L_2$, diode $D_2$, switch $A_f$, and capacitor $C_2$ as shown in FIG. 12B. Voltages $V_{p1}$ and $V_{p2}$ at panel capacitors $C_{p1}$ and $C_{p2}$ are reduced by the resonance path, and capacitor $C_2$ is charged with a voltage in the same manner as in Mode 2 of FIG. 9.

Figure 12C:
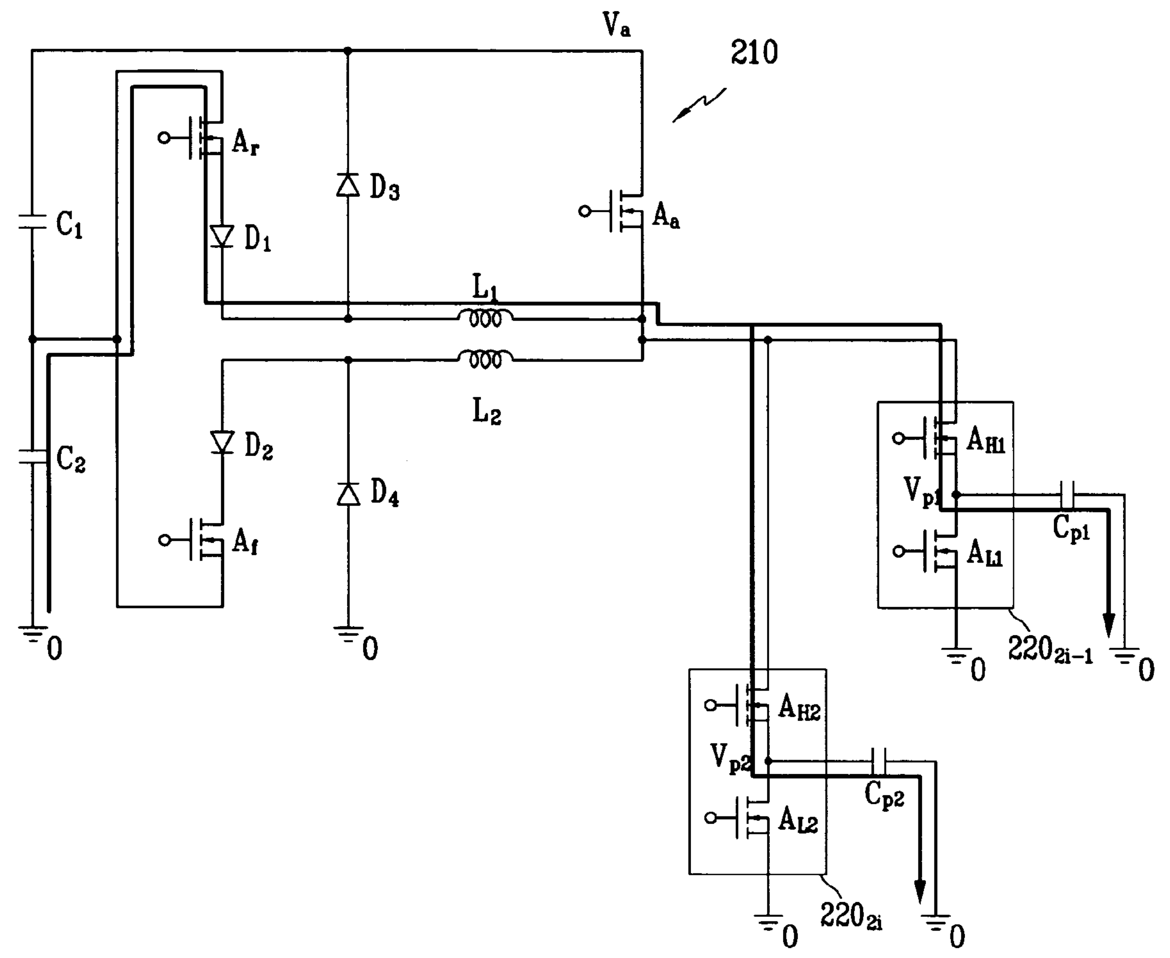

In Mode 3 (M3), switch $A_f$ is turned off and switch $A_r$ is turned on to form a resonance path through capacitor $C_2$, switch $A_r$, diode $D_1$, inductor $L_1$, switch $A_{H2}$, and panel capacitors $C_{p1}$ and $C_{p2}$ as shown in FIG. 12C. Voltages $V_{p1}$ and $V_{p2}$ at panel capacitors $C_{p1}$ and $C_{p2}$ are increased by the resonance path, and capacitor $C_2$ is discharged. Voltages $V_{p1}$ and $V_{p2}$ at panel capacitors $C_{p1}$ and $C_{p2}$ do not exceed the voltage $V_a$ because the body diode of switch $A_a$ is turned on when voltages $V_{p1}$ and $V_{p2}$ reach the voltage $V_8$.

Figure 12D:
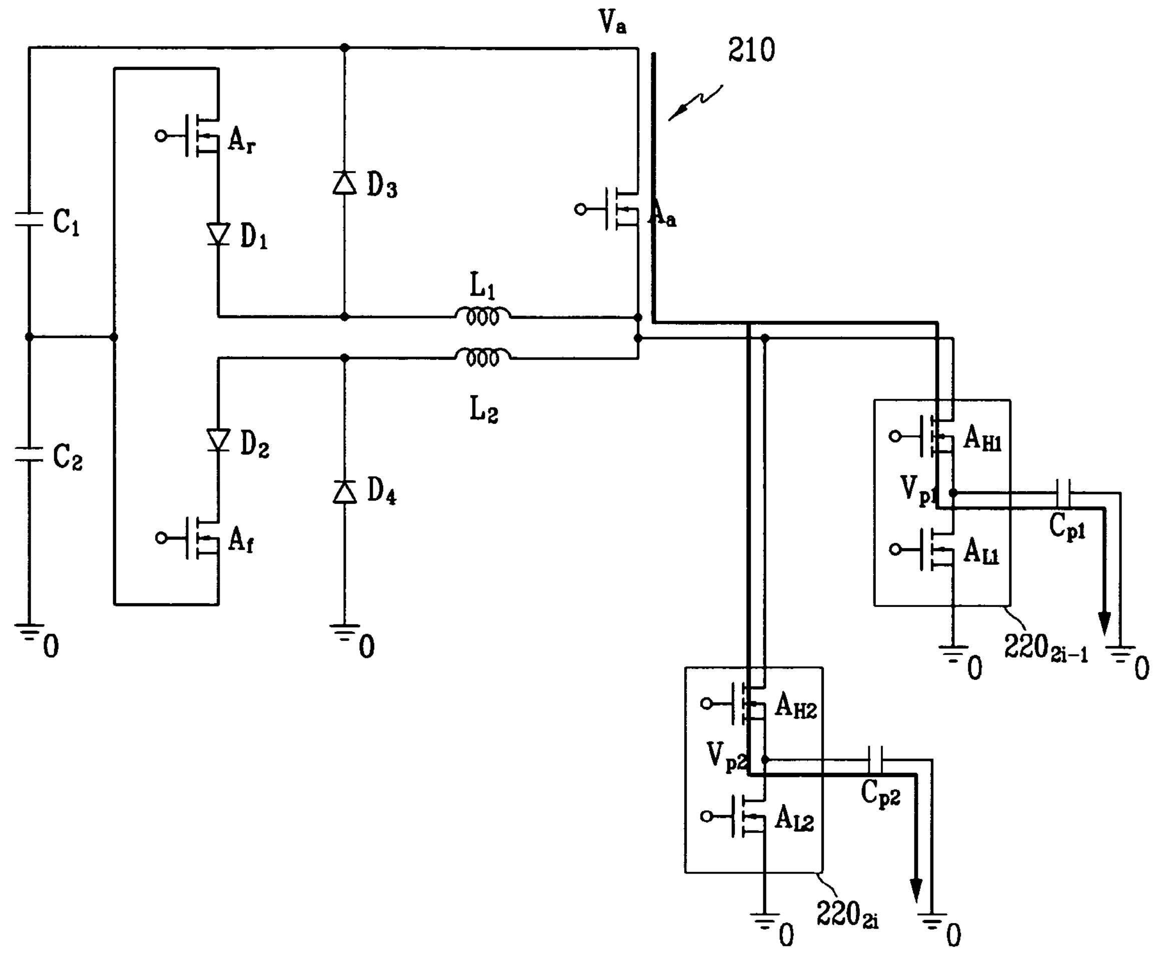

In Mode 4, switch $A_a$ is turned on and then switch $A_r$ is turned off to maintain voltages $V_{p1}$ and $V_{p2}$ of panel capacitors $C_{p1}$ and $C_{p2}$ at $V_a$ as shown in FIG. 12D.

During Modes 1 through 4, the power recovery circuit 210 supplies the voltage $V_a$ to the address electrodes $A_{2i-1}$ and $A_{2i}$ through switches $A_{H1}$ and $A_{H2}$ of the address selecting circuits 220$_{2i-1}$ and 220$_{2i}$ as described. In displaying the full white pattern of FIG. 9, the Modes 1 through 4 are repeated while the switches $A_{H1}$ and $A_{H2}$ are turned on.

Because switches $A_{L1}$ and $A_{L2}$ of the address electrodes $A_{2i-1}$ and $A_{2i}$ are not turned on in the full white pattern of FIG. 9, panel capacitors $C_{p1}$ and $C_{p2}$ are charged in Mode 3 but the residual voltage in panel capacitors $C_{p1}$ and $C_{p2}$ is not discharged after panel capacitors $C_{p1}$ and $C_{p2}$ are discharged in Mode 2. Therefore, assuming that 100% of the energy is recovered and used, the energy of charging capacitor $C_2$ in Mode 2 and the energy discharged from capacitor $C_2$ in Mode 3 (M3) are substantially the same. In displaying the full white pattern of FIG. 9, the voltage ⊿V1 charged in capacitor $C_2$ is always greater than the voltage ⊿V2 discharged from capacitor $C_2$ because the operation of supplying current to capacitor $C_2$ to charge the capacitor $C_2$ in Mode 1 is further performed.

When the processes of Modes 1 through 4 are repeated, the voltage at capacitor $C_2$ is increased because the voltage ⊿V1 charged in the capacitor $C_2$ is always greater than the voltage ⊿V2 discharged from the capacitor $C_2$. When the voltage at capacitor $C_2$ is increased, the current discharged from panel capacitors $C_{p1}$ and $C_{p2}$ to capacitor $C_2$ is reduced in Mode 2 to reduce the amount discharged from panel capacitors $C_{p1}$ and $C_{p2}$. As shown in FIG. 11 voltages $V_{p1}$ and $V_{p2}$ at panel capacitors $C_{p1}$ and $C_{p2}$ are reduced when Modes 1 through 4 are repeated.

When the voltage at capacitor $C_2$ is continuously increased to substantially correspond to the voltage Of $V_a$, panel capacitors $C_{p1}$ and $C_{p2}$ are not discharged in Mode 2 because voltages $V_{p1}$ and $V_{p2}$ at panel capacitors $C_{p1}$ and $C_{p2}$ correspond to the voltage at capacitor $C_2$. Panel capacitors $C_{p1}$ and $C_{p2}$ are not charged in Mode 3 because voltages $V_{p1}$ and $V_{p2}$ at panel capacitors $C_{p1}$ and $C_{p2}$ are not reduced in Mode 2. When the voltage at capacitor $C_2$ reaches the voltage $V_a$, the substantial current movement almost disappears in Modes 2 and 3 and the power recovery circuit 210 essentially does not operate in displaying the full white pattern.

As described above, the operation of the power recovery circuit according to the exemplary embodiment of the present invention is established when the voltage level of capacitor $C_2$ is varied by the switching operation of the address selecting circuit. The voltage of capacitor $C_2$ is determined by the energy charged in and discharged from capacitor $C_2$. Because the charge energy of capacitor $C_2$ includes the energy supplied by the power $V_a$ through an inductor and the discharge energy of the panel capacitor, and because the discharge energy of the capacitor $C_2$ includes the charge energy of the panel capacitor, the charge energy of the capacitor $C_2$ is greater than the discharge energy thereof when the capacitor $C_2$ is charged with the voltage $V_a/2$ which is half the voltage of the address voltage.

In the case of the dot on/off pattern, because the panel capacitor charged up to the address voltage is completely discharged down to the ground voltage and then charged up again to the address voltage by the turn-on of switch $A_L$ of the address selecting circuit, the charge energy of the panel capacitor, which is the discharge energy of capacitor $C_2$, is almost constant. In addition, the voltage at capacitor $C_2$ is increased, and the charge energy of capacitor $C_2$ is accordingly reduced because the charge energy of capacitor $C_2$ is greater than the discharge energy thereof while the capacitor $C_2$ is charged with a voltage of $V_a/2$. Therefore, when the above operation is repeated, the charge energy of the capacitor $C_2$ is reduced to correspond substantially to the discharge energy of the capacitor $C_2$, thereby performing the power recovery operation.

Because of the many switching variations of the address selecting circuits 220$_1$ to 220$_m$, Capacitor $C_2$ is charged with a voltage between $V_a/2$ and $V_a$ to perform the power recovery operation when many panel capacitors, charged up to the address voltage after being completely discharged down to the ground voltage, are provided from among a plurality of panel capacitors connected to the address selecting circuits 220$_1$ to 220$_m$.

In the case of the full white pattern, switch $A_L$, which is connected to the panel capacitor charged up to the address voltage, is not turned on. When the charge energy of capacitor $C_2$ is greater than its discharge energy, so that the voltage at capacitor $C_2$ becomes greater than $V_a/2$, the voltage at the panel capacitor is not discharged down to the ground voltage by the resonance of the inductor and the panel capacitor. A residual voltage is generated because switch $A_L$, which is connected to the panel capacitor charged up to the address voltage, is not turned on. The charge energy and the discharge energy of the panel capacitor are reduced in the same manner by the residual voltage, and accordingly, the voltage at capacitor $C_2$ is continuously increased. When the voltage at capacitor $C_2$ is increased, the residual voltage at the panel capacitor is also increased, almost no energy is charged in the panel capacitor and discharged from the same, and almost no energy is exhausted in the power recovery circuit.

The above-noted power recovery operation is rarely performed for a pattern wherein only one color is displayed on the whole screen, or a pattern wherein the address voltage is continuously applied to a predetermined amount of address electrodes in addition to the full white pattern.

In the above-described exemplary embodiment of the present invention, the power recovery operation is performed in a pattern that, because of many switching variations of the address selecting circuit, requires the power recovery operation and no power recovery operation is automatically performed in a pattern that, because of few switching variations of the address selecting circuit, requires no power recovery operation.

As an example, it may be assumed for purposes of this description that in the driving circuit shown in FIG. 4, the whole panel capacitances in the dot on/off pattern, the line on/off pattern, and the full white pattern are about 169 nF, 217 nF, and 288 nF, respectively. With that panel capacitance, if the capacitor C1 has a capacitance of 10 μF, the capacitor C2 has a capacitance of 10 μF, the inductor L1 has an inductance of 0.1 μH, the inductor L2 has an inductance of 0.1 μH, the address voltage $V_a$ is 60–65V. As those of skill in the art will realize, the above is only one example of the characteristics of the components and the lengths of the periods in embodiments of the invention; components with other characteristics and periods of different lengths may be used.

Figure 13:
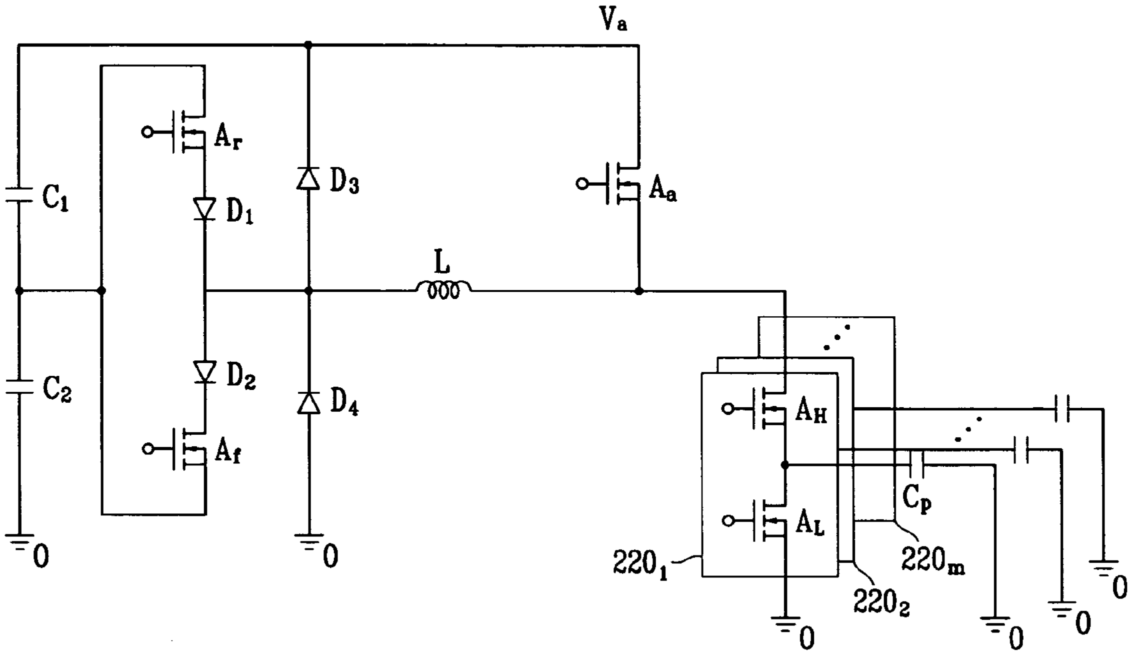
FIG. 13 shows an address driving circuit according to a second preferred embodiment of the present invention.

Inductor $L_1$ used for discharging capacitor $C_2$ is different from inductor $L_2$ used for charging capacitor $C_2$ in the exemplary embodiment. However, the same inductor L can be used as shown in FIG. 13. A first terminal of inductor L is connected to a second terminal of switch $A_H$ of the address selecting circuit 220$_1$ to 220$_m$, and a second terminal of inductor L is connected in parallel to diodes $D_1$ and $D_2$. Accordingly, the current charged in capacitor $C_2$ and the current therefrom flow through inductor L.

The power recovery circuit according to this embodiment may comprise a switch connected between the second terminal of switch $A_H$ of the address selecting circuit and the ground voltage.

According to the present invention, the power recovery operation is performed in a pattern with many switching variations of the address selecting circuit, and the power recovery operation is automatically intercepted in a pattern without switching variations of the address selecting circuit, thereby reducing the power consumption. Zero-voltage switching is performed when the address voltage is applied because an external capacitor is charged with a value greater than half of a predetermined voltage.

A similar invention is described in the patent application, filed together with this application and assigned to the same assignee, entitled "DRIVING METHOD OF PLASMA DISPLAY PANEL AND PLASMA DISPLAY DEVICE", application Ser. No. 10/948,179, which is incorporated by reference.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A device for driving a plasma display panel on which first electrodes and second electrodes are formed, a capacitive load being formed by the first electrode and the second electrode, the device comprising:

at least one inductor having a first terminal coupled to the first electrode;

a capacitor coupled to a second terminal of the inductor;

at least one first switch coupled between the inductor and the capacitor or between the inductor and the first electrode, charging or discharging the capacitive load by a resonance of the capacitive load and the inductor by being turned on, and forming a first current path allowing a first energy to be discharged from the capacitor and a second current path allowing a second energy greater than the first energy to be charged in the capacitor; and a second switch applying a first voltage to the first electrode after the capacitive load is charged by being turned on, wherein the second energy includes an energy discharged from the capacitive load by the resonance of the capacitive load and the inductor, and the first energy includes an energy for charging the capacitive load by the resonance of the capacitive load and the inductor.

2. The device of claim 1, wherein an energy is supplied to the capacitor from a first power for supplying the first voltage through the inductor before the capacitive load is discharged, and wherein the second energy further includes an energy supplied from the first power.

3. The device of claim 2, further comprising:

a first path formed by the capacitor, the inductor, and the first electrode, for increasing a voltage of the first electrode;

a second path formed by the first power and the first electrode, for maintaining the voltage of the first electrode at the first voltage;

a third path formed by the first power, the inductor, and the capacitor, for supplying a current to the inductor; and a fourth path formed by the first electrode, the inductor, and the capacitor, for reducing a voltage of the first electrode.

4. The device of claim 2, wherein the second switch is coupled between the first power and a common node of the first terminal of the inductor and the first electrode, and the first switch includes a third switch and a fourth switch coupled in parallel between the second terminal of the inductor and the capacitor.

5. The device of claim 4, wherein the second switch, the third switch and the fourth switch are transistors respectively including a body diode, and the device further comprises:

a first diode formed in the opposite direction of the body diode of the third switch in the path of the capacitor, the third switch, and the second terminal of the inductor; and a second diode formed in the opposite direction of the body diode of the fourth switch in the path of the capacitor, the fourth switch, and the second terminal of the inductor.

6. The device of claim 1, wherein the inductor includes a first inductor and a second inductor, and wherein the device charges the capacitive load through the first inductor and discharges the capacitive load through the second inductor.

7. The device of claim 1, wherein the inductor on the path of charging the capacitive load corresponds to the inductor on the path of discharging the capacitive load.

8. The device of claim 1, wherein the first electrode is formed to cross the second electrode, and the second electrodes are sequentially selected, and discharge cells to be turned on are selected by a voltage applied to the selected second electrodes and the first electrodes during an address period.

9. The device of claim 8, wherein the device further comprises a plurality of address selecting circuits coupled between the first terminal of the inductor and the first electrodes, and the address selecting circuit includes a fifth switch coupled between the first electrode and the first terminal of the inductor, and a sixth switch coupled between the first electrode and a second power for supplying a second voltage.

10. The device of claim 9, wherein the discharge cells to be turned on are selected by the first electrodes coupled to the address selecting circuits of the turned-on fifth switches and the second electrodes from among the address selecting circuits.

11. The device of claim 9, wherein the capacitor is substantially charged with the first voltage when the fifth switches of the address selecting circuits are turned on while the second electrodes are sequentially selected.

12. The device of claim 1, wherein the capacitor is charged with a voltage between half of the first voltage and the first voltage.

13. The device of claim 12, wherein the capacitor voltage is variable.

14. A method for driving a plasma display panel on which a plurality of first electrodes and a plurality of second electrodes are formed, a capacitive load being formed by the first electrode and the second electrode, the method comprising:

selecting from among the first electrodes a first electrode to which a first voltage will be programmed and increasing a voltage of the first electrode selected through a first inductor having a first terminal coupled to the first electrode;

substantially maintaining the voltage of the selected first electrode at the first voltage;

supplying a current to a second inductor coupled to the first electrode while substantially maintaining the voltage of the selected first electrode at the first voltage; and reducing the voltage of the selected first electrode through the second inductor.

15. The method of claim 14, wherein a capacitor is coupled to a second terminal of the first inductor and a second terminal of the second inductor when the voltage of the first electrode is increased and reduced.

16. The method of claim 15, wherein the capacitor is discharged when the voltage of the first electrode is increased through the first inductor, and wherein the capacitor is charged when the current is supplied to the second inductor and the voltage of the first electrode is reduced through the second inductor.

17. The method of claim 16, wherein an energy discharged from the capacitor is less than an energy charged in the capacitor.

18. The method of claim 16, wherein the voltage stored in the capacitor corresponds to a voltage between half the first voltage and the first voltage.

19. The method of claim 15, wherein the first inductor and the second inductor are the same.

20. The method of claim 15, wherein the first inductor and the second inductor are different.

21. The method of claim 15, wherein the first electrode is an address electrode, and the second electrode is a scan electrode.

22. The method of claim 21, wherein a second voltage is sequentially applied to the second electrodes, and all steps are repeated each time the second voltage is sequentially applied to the second electrode, and wherein the voltage of the capacitor is varied according to a combination of a previously selected first electrode and a currently selected first electrode.

23. The method of claim 22, wherein the voltage at the capacitor substantially corresponds to the first voltage when a predetermined number of first electrodes are continuously selected.

24. A plasma display device, comprising:

a panel including a plurality of first electrodes extending in one direction and a plurality of second electrodes crossing the first electrodes;

a first driving circuit for sequentially applying a first voltage to the first electrodes;

a selecting circuit coupled to the second electrodes for selecting from among the second electrodes a second electrode to which data will be applied;

a second driving circuit including at least one inductor coupled to the selecting circuit and a capacitor coupled to the inductor through a switch for applying a second voltage to the second electrode selected by the selecting circuit, charging a capacitive load formed by the selected second electrode and the first electrode through the capacitor and the inductor, and discharging the capacitive load through the capacitor and the inductor, wherein the selecting circuit discharges a residual voltage after the capacitive load is discharged through the capacitor and the inductor.

25. The plasma display device of claim 24, wherein the second driving circuit supplies a current to the capacitor before discharging the capacitive load.

26. The plasma display device of claim 25, wherein the second driving circuit applies the second voltage to the second electrode after the capacitive load is charged.

27. The plasma display device of claim 24, wherein the second driving circuit further comprises:

a first switch coupled to the second voltage and the selecting circuit;

a second switch coupled between the inductor and the capacitor;

a third switch coupled between the inductor and the capacitor;

a first diode provided on a path formed by the inductor, the second switch, and the capacitor; and a second diode provided on a path formed by the inductor, the third switch, and the capacitor.

28. The plasma display device of claim 24, wherein the selecting circuit includes a first switch coupled between the inductor and the second electrode, and a second switch coupled between the second electrode and the third voltage, and wherein the second electrode is selected when the first switch is turned on.

29. The plasma display device of claim 28, wherein the second switch of the selecting circuit coupled to the second electrode that is not selected is turned on to discharge the residual voltage of the capacitive load.

30. The plasma display device of claim 24, wherein the inductor includes a first inductor for forming a path for charging the capacitive load, and a second inductor for forming a path for discharging the capacitive load.

31. The plasma display device of claim 30, wherein the second driving circuit further comprises:

a first switch coupled to the second voltage and the selecting circuit;

a second switch coupled between the first inductor and the capacitor;

a third switch coupled between the second inductor and the capacitor;

a first diode provided on a path formed by the first inductor, the second switch, and the capacitor; and a second diode provided on a path formed by the second inductor, the third switch, and the capacitor.

32. A plasma display device, comprising:

a panel including a plurality of first electrodes provided in one direction and a plurality of second electrodes crossing the plurality of first electrodes;

a first driving circuit for sequentially applying a first voltage to the plurality of first electrodes;

a selecting circuit coupled to the plurality of second electrodes, for selecting from among the second electrodes a second electrode to which data will be applied; and a second driving circuit including at least one inductor coupled to the selecting circuit, and a capacitor coupled to the inductor through at least one switch, and charging and discharging the capacitive load formed by the first electrode and the selected second electrode by turning on the switch, and forming a first current path allowing a first energy to be discharged from the capacitor and a second current path allowing a second energy greater than the first energy to be charged in the capacitor.

33. The plasma display device of claim 32, wherein a residual voltage of the capacitive load after the capacitive load is discharged is discharged by driving the selecting circuit.

34. The plasma display device of claim 32, wherein the current is supplied to the capacitor from a power through the inductor before the capacitive load is discharged.

35. The plasma display device of claim 34, wherein the second energy includes an energy discharged from the capacitive load and an energy supplied from the power through the inductor, and wherein the first energy includes an energy for charging the capacitive load.

36. A plasma display device, comprising:

a panel including a plurality of first electrodes provided in one direction and a plurality of second electrodes crossing the first electrodes;

a first driving circuit for sequentially selecting the first electrodes;

a selecting circuit coupled to the second electrodes for selecting second electrodes to which data will be applied from among the second electrodes; and a second driving circuit including at least one inductor coupled to the selecting circuit and a capacitor coupled to the inductor through at least one switch, charging and discharging the capacitive load formed by the first electrode and the selected second electrode by turning on the switch, wherein the voltage of the capacitor is varied according to a pattern of the second electrode selected from the selecting circuit, while the first electrodes are sequentially selected.

37. The plasma display device of claim 36, wherein the energy charged in the capacitor includes a discharge energy of the capacitive load, and the energy discharged from the capacitor includes a charge energy of the capacitive load.

38. The plasma display device of claim 36, wherein the second driving circuit supplies a current to the capacitor through the inductor before discharging the capacitive load.

39. A plasma display device, comprising:

a panel including a plurality of first electrodes extending in one direction and a plurality of second electrodes crossing the plurality of first electrodes;

a first driving circuit for sequentially selecting the plurality of first electrodes;

a selecting circuit coupled to the plurality of second electrodes, for selecting from among the plurality of second electrodes a second electrode to which data will be applied;

a second driving circuit including at least one inductor coupled to the selecting circuit and a capacitor coupled to the inductor through at least one switch, charging and discharging the capacitive load formed by the first electrode and the selected second electrode by turning on the switch, wherein the voltage of the capacitor substantially approximates the second voltage when a predetermined number of second electrodes are continuously selected in the selecting circuit while the first electrodes are sequentially selected.

40. A plasma display device, comprising:

a panel including a plurality of first electrodes extending in one direction and a plurality of second electrodes crossing the plurality of first electrodes;

a first driving circuit for sequentially selecting the plurality of first electrodes;

a selecting circuit coupled to the plurality of second electrodes for selecting from among the plurality of second electrodes a second electrodes to which data will be applied;

a second driving circuit including at least one inductor coupled to the selecting circuit and a capacitor coupled to the inductor through at least one switch, and charging and discharging the capacitive load formed by the first electrode and the selected second electrode by turning on the switch, wherein the discharge amount of the capacitive load is reduced when a predetermined number of second electrodes are continuously selected in the selecting circuit while the first electrodes are sequentially selected.

* * * * *